United States Patent
Subramanian et al.

(10) Patent No.: US 8,311,878 B2
(45) Date of Patent: Nov. 13, 2012

(54) OPTIMIZED PRICING SOLVER WITH PRIORITIZED CONSTRAINTS

(75) Inventors: Shivaram Subramanian, Eddington, ME (US); Aihua Xu, Newton, MA (US); Joseph Krebs, Atlanta, GA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 13/113,492

(22) Filed: May 23, 2011

(65) Prior Publication Data

US 2012/0232959 A1 Sep. 13, 2012

Related U.S. Application Data

(60) Provisional application No. 61/451,860, filed on Mar. 11, 2011.

(51) Int. Cl.
G06Q 10/00 (2006.01)
G06Q 30/00 (2006.01)

(52) U.S. Cl. ............ 705/7.35; 705/7.11; 705/7.28; 705/7.31; 705/7.37

(58) Field of Classification Search ......... 705/7.11–7.42
See application file for complete search history.

(56) References Cited

U.S. PATENT DOCUMENTS

| | | | |
|---|---|---|---|
| 6,038,537 A * | 3/2000 | Matsuoka | 705/7.12 |
| 7,302,410 B1 | 11/2007 | Venkatraman et al. | |
| 7,523,047 B1 | 4/2009 | Neal et al. | |
| 7,613,626 B1 * | 11/2009 | Muniganti et al. | 705/7.35 |
| 7,617,119 B1 | 11/2009 | Neal et al. | |
| 7,657,470 B1 | 2/2010 | Delurgio et al. | |
| 7,660,734 B1 | 2/2010 | Neal et al. | |
| 7,672,866 B2 | 3/2010 | Venkatraman et al. | |
| 7,809,581 B1 | 10/2010 | Neal et al. | |
| 7,877,286 B1 | 1/2011 | Neal et al. | |
| 7,895,116 B2 | 2/2011 | Chatter et al. | |
| 7,899,691 B1 | 3/2011 | Lee et al. | |
| 7,912,748 B1 | 3/2011 | Rosenberg et al. | |
| 7,921,061 B2 * | 4/2011 | Rangarajan et al. | 705/400 |
| 7,937,282 B2 | 5/2011 | Walser et al. | |
| 7,945,509 B1 | 5/2011 | Chatter et al. | |
| 7,996,331 B1 * | 8/2011 | Solanki et al. | 705/400 |
| 2002/0165760 A1 | 11/2002 | Delurgio et al. | |
| 2002/0165834 A1 | 11/2002 | Delurgio et al. | |
| 2005/0256778 A1 | 11/2005 | Boyd et al. | |

(Continued)

OTHER PUBLICATIONS

The Lagrangian Relaxation Method for Solving Integer Programming Problems. Marshall L. Fisher. Management Science, vol. 27, No. 1 (Jan. 1981), pp. 1-18. Published by: INFORMS. Stable URL: http://www.jstor.org/stable/2631139.*

(Continued)

*Primary Examiner* — Jason Dunham
*Assistant Examiner* — Richard Scheunemann
(74) *Attorney, Agent, or Firm* — Squire Sanders (US) LLP

(57) ABSTRACT

A pricing optimization system can solve a constrained optimization problem by generating one or more prices for one or more items that satisfy a maximum number of prioritized constraints. The one or more generated prices can be one or more prices that represent a minimal deviation between the generated one or more prices and one or more original prices for the one or more items. By satisfying a maximum number of prioritized constraints, and by minimizing a deviation from the one or more original prices for the one or more items, the generated one or more prices are one or more optimal prices.

21 Claims, 8 Drawing Sheets

U.S. PATENT DOCUMENTS

| | | | |
|---|---|---|---|
| 2006/0195345 | A1 | 8/2006 | Close et al. |
| 2007/0027674 | A1* | 2/2007 | Parson et al. ............... 704/9 |
| 2007/0043655 | A1 | 2/2007 | Phillips et al. |
| 2007/0282667 | A1 | 12/2007 | Cereghini et al. |
| 2008/0235076 | A1 | 9/2008 | Cereghini et al. |
| 2009/0063251 | A1 | 3/2009 | Rangarajan et al. |
| 2009/0138300 | A1* | 5/2009 | Kagan et al. ............... 705/7 |
| 2009/0144101 | A1 | 6/2009 | Malov |
| 2009/0287560 | A1* | 11/2009 | Sandholm et al. ......... 705/14.23 |
| 2009/0327037 | A1 | 12/2009 | Ng et al. |
| 2010/0036735 | A1* | 2/2010 | Hamilton et al. ......... 705/14.55 |
| 2011/0071857 | A1 | 3/2011 | Malov et al. |

OTHER PUBLICATIONS

Nemhauser and Wolsey, "Integer and Combinational Optimization," Chapter 11.6 Applications of Special-Purpose Algorithms, pp. 433-527.*

Nemhauser and Wolsey, "Integer and Combinational Optimization," Chapter II.5 Special-Purpose Algorithms, pp. 383-427.

Nemhauser and Wolsey, "Integer and Combinational Optimiation," Chapter II.6 Applications of Special-Purpose Algorithms, pp. 433-527.

IBM Software ILOG Optimization; "IBM ILOG CPLEX Optimizer"; Data Sheet; IBM Corporation; Somer, NY, USA; © Copyright IBM Corporation 2010; pp. 1-6.

Shivaram Subramanian et al.; "A fractional programming approach for retail category price optimization"; J Glob Optim (2010) 48:263-277; DOI 10.1007/s10898-009-9491-2; © Springer Science+Business Media, LLC.2009; published online Nov. 21, 2009.

\* cited by examiner

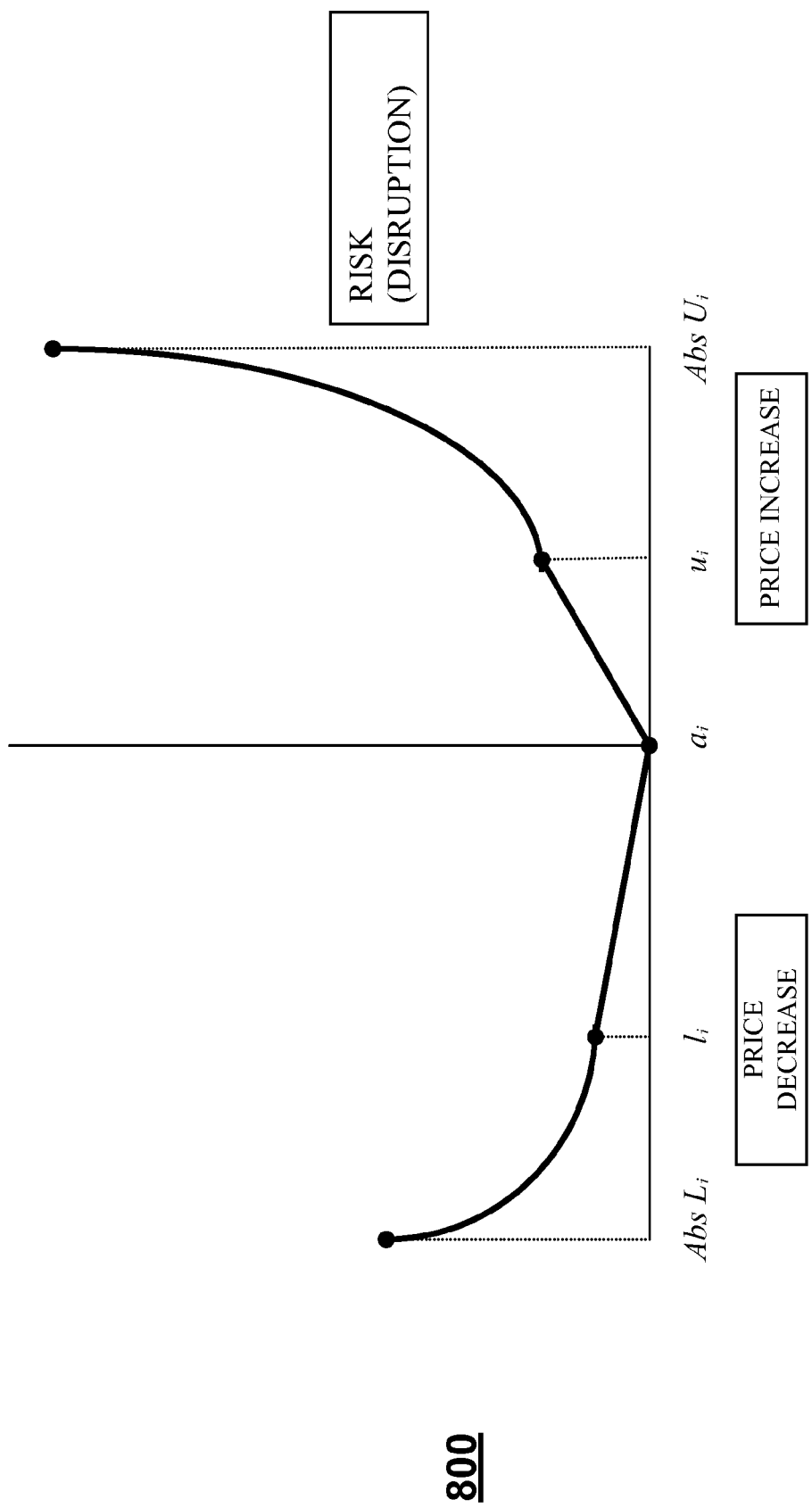

us 8,311,878 B2

OPTIMIZED PRICING SOLVER WITH PRIORITIZED CONSTRAINTS

CROSS-REFERENCE TO RELATED APPLICATIONS

This application claims priority of U.S. Provisional Patent Application Ser. No. 61/451,860, filed on Mar. 11, 2011, the subject matter of which is hereby incorporated by reference.

FIELD

One embodiment is directed to a computer system, and more particularly, to computer systems that determine optimized pricing.

BACKGROUND

In mathematics and computer science, an optimization problem is a problem of finding a best (i.e., optimal) solution among all feasible solutions. One type of optimization problem is a constrained optimization problem, where an optimal solution is required to satisfy one or more conditions (i.e., constraints).

Constrained optimization problems can arise in specific industries, such as retail, when market conditions can dictate a set of one or more constraints that must be taken into consideration when formulating a business solution. However, these market conditions are usually not taken into consideration when formulating initial business plans because, at the time of formulating the initial business plans, the market conditions have generally not arisen. Thus, an optimal business solution that is formulated when taking into consideration constraints, such as constraints caused by market conditions, can result in a significant deviation from an initial business plan. This significant deviation can seriously disrupt business decisions that have already been made with respect to the initial business plan, and business decisions that will be made in the future.

SUMMARY

One embodiment is directed to a computer-readable medium having instructions stored thereon that, when executed by a processor, cause the processor to solve a constrained pricing optimization problem. The instructions include defining one or more constraints, where each constraint of the one or more constraints includes a mathematical representation of one or more restrictions on a price. The instructions further include assigning a priority to each of the one or more constraints, and generating one or more prices for one or more items that satisfy a maximum number of the prioritized constraints. The instructions further include computing a risk value for each price of the one or more prices, for each item, where the risk value represents a deviation of the price from an original price of the corresponding item, and selecting the price from the one or more prices, for each item, whose risk value represents a minimum deviation from the original price of the item.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIG. 8 illustrates an example risk model instance, according to an embodiment of the invention.

DETAILED DESCRIPTION

According to an embodiment, a pricing optimization system can solve a constrained optimization problem by generating a set of prices for a set of retail items, such as groceries, that satisfies, to the best extent possible, a set of constraints assigned a specific priority (i.e., prioritized constraints). The solution can include a generated set of prices that minimally disrupts an existing business plan by minimizing a deviation between the generated set of prices and a set of original prices that can be associated with the set of retail items. By satisfying, to the best extent possible, the prioritized constraints, and by minimizing a deviation from the set of original prices, the generated set of prices are optimal prices. Thus, the pricing optimization system can provide an optimal pricing solution for retailers, and help the retailers generate optimal prices for selling their retail items. The generated set of optimal prices can help increase sales of the retail items, as well as increases sales of other retail items sold by the retailers.

Figure 1:
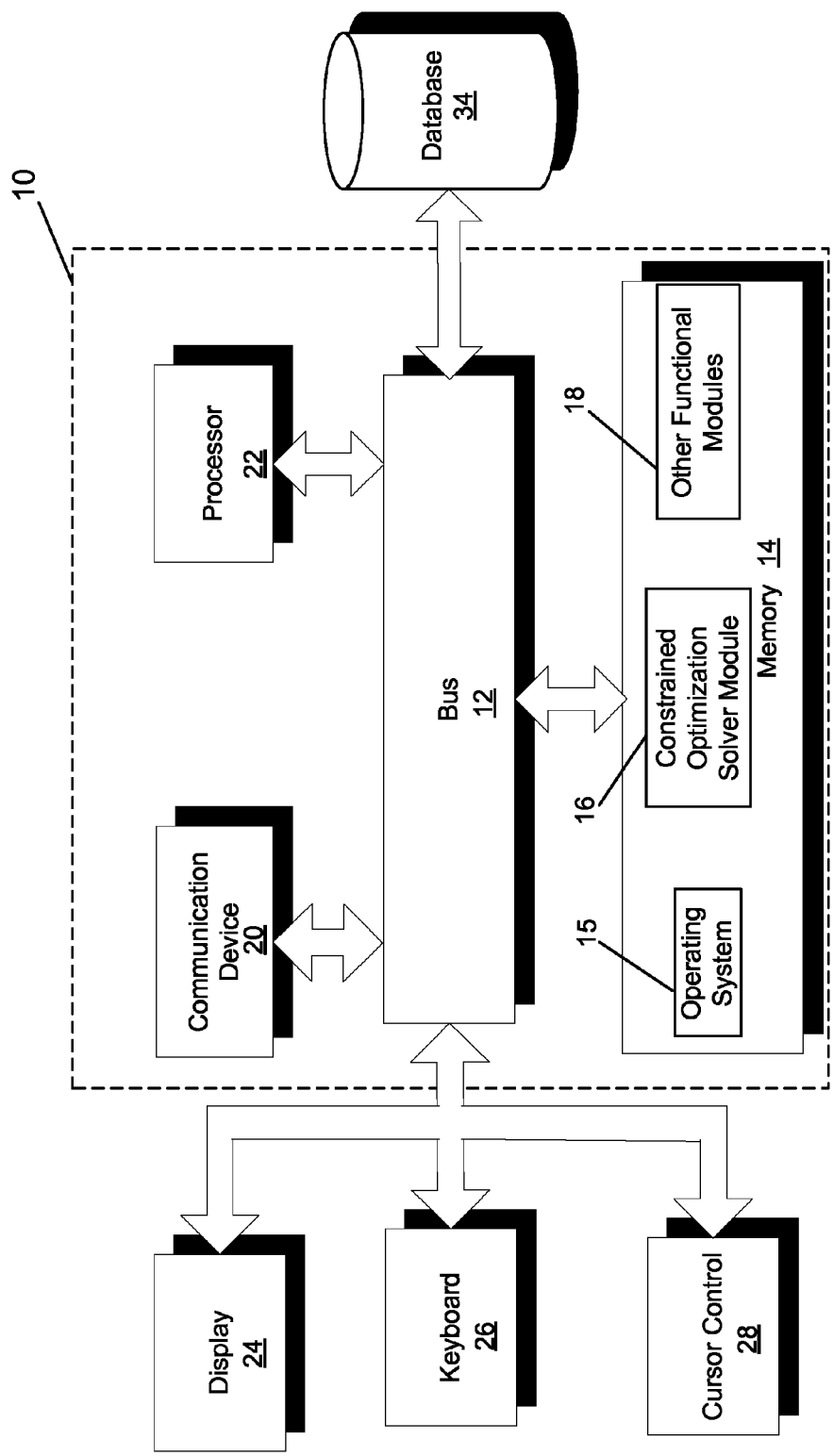
FIG. 1 illustrates a block diagram of a pricing optimization system that may implement an embodiment of the invention.

FIG. 1 illustrates a block diagram of a pricing optimization system 10 that may implement one embodiment of the invention. Pricing optimization system 10 includes a bus 12 or other communications mechanism for communicating information between components of pricing optimization system 10. Pricing optimization system 10 also includes a processor 22, operatively coupled to bus 12, for processing information and executing instructions or operations. Processor 22 may be any type of general or specific purpose processor. Pricing optimization system 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer-readable medium. Pricing optimization system 10 further includes a communication device 20, such as a network interface card or other communications interface, to provide access to a network. As a result, a user may interface with pricing optimization system 10 directly, or remotely through a network or any other method.

A computer-readable medium may be any available medium that can be accessed by processor 22. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Processor 22 can also be operatively coupled via bus 12 to a display 24, such as a Liquid Crystal Display ("LCD"). Display 24 can display information to the user. A keyboard 26 and a cursor control device 28, such as a computer mouse, can also be operatively coupled to bus 12 to enable the user to interface with pricing optimization system 10.

According to one embodiment, memory 14 can store software modules that may provide functionality when executed by processor 22. The modules can include an operating system 15, a constrained optimization solver module 16, as well as other functional modules 18. Operating system 15 can provide an operating system functionality for pricing optimization system 10. Constrained optimization solver module 16 can provide functionality for generating one or more prices for one or more items, as will be described in more detail below. Pricing optimization system 10 can also be part of a larger system. Thus, pricing optimization system 10 can include one or more additional functional modules 18 to include the additional functionality. For example, functional modules 18 may include modules that provide additional functionality, such as a "Regular Price Optimization" product from Oracle Corporation.

In one embodiment, constrained optimization solver module 16 is a stand-alone module. Constrained optimization solver module 16 can include scalable implementations of one or more mathematical optimization algorithms that generate one or more optimal prices for one or more items based on an underlying demand model. As previously described, the one or more prices generated by constrained optimization solver module 16 are optimal prices, because the one or more optimal prices satisfy, to the best extent possible, one or more prioritized constraints, and because the one or more optimal prices minimize a deviation from one or more original prices associated with the one or more items. Constrained optimization solver module 16 can use a combination of exact and heuristic algorithms to generate the one or more optimal prices. An exact algorithm, as understood by one of ordinary skill in the art, is an algorithm that provides a best, or optimal, solution to a problem. A heuristic algorithm, as also understood by one of ordinary skill in the art, is an algorithm that provides a good solution to a problem, but where the good solution is not necessarily a best, or optimal, solution. The one or more optimal prices can satisfy, to the best extent possible, business objectives, goals, and constraints set by a user.

In an alternate embodiment, constrained optimization solver module 16 can be embedded with a larger back-end software module (not shown in FIG. 1). Examples of the back-end software module include Calc Engine ("CE") and Retail Predictive Application Server ("RPAS"). CE is a back-end software module that can calculate a demand forecast. RPAS is a configurable software module that can develop multidimensional forecasting and planning-based solutions.

Processor 22 can also be operatively coupled via bus 12 to a database 34. Database 34 can store data in an integrated collection of logically-related records or files. Database 34 can be an operational database, an analytical database, a data warehouse, a distributed database, an end-user database, an external database, a navigational database, an in-memory database, a document-oriented database, a real-time database, a relational database, an object-oriented database, or any other database known in the art.

Figure 2:
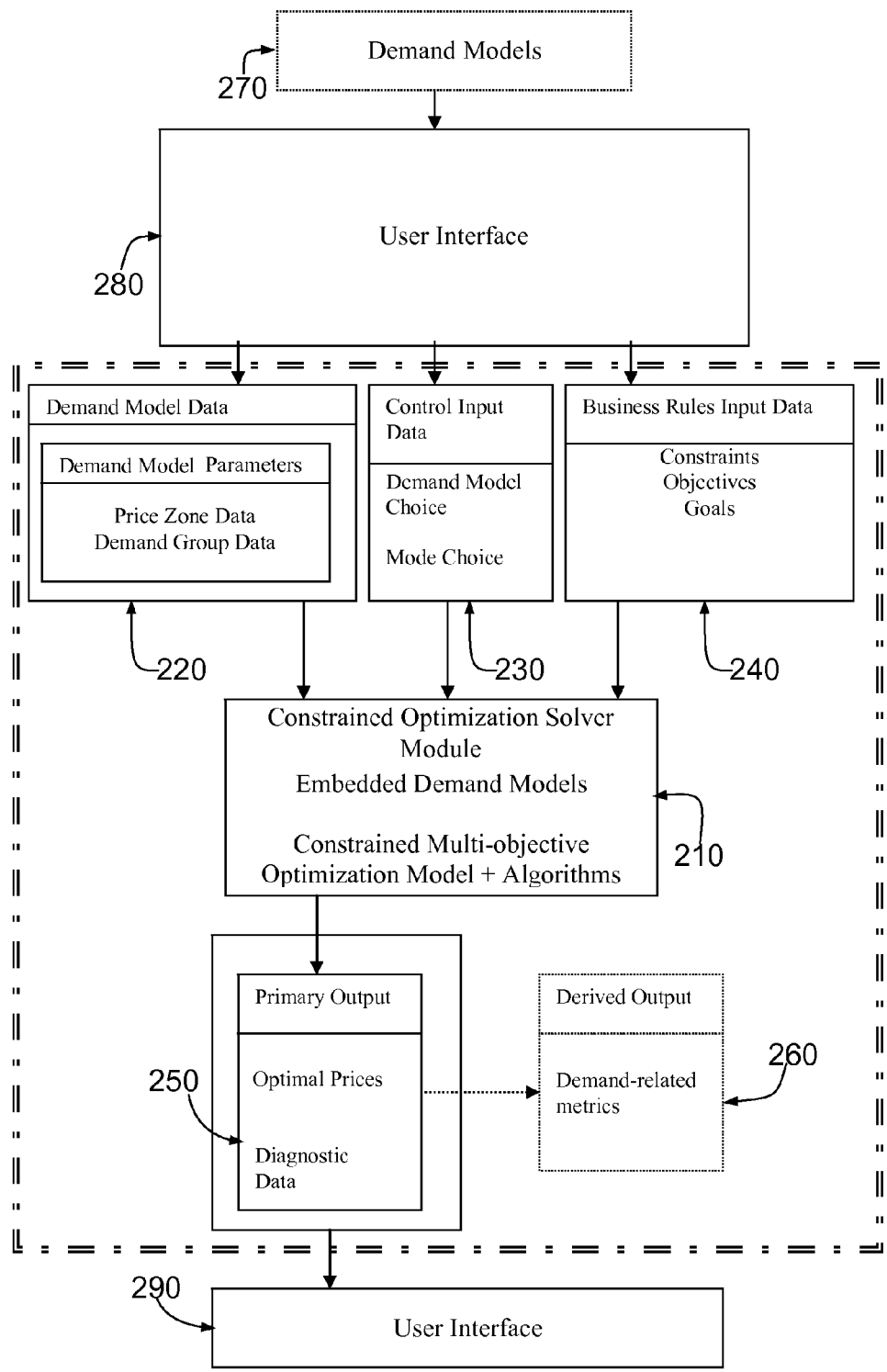
FIG. 2 illustrates a schema of a constrained optimization solver module, according to an embodiment of the invention.

FIG. 2 illustrates a schema of a constrained optimization solver module 210, according to an embodiment of the invention. In one embodiment, constrained optimization solver module 210 is similar to constrained optimization solver module 16 of FIG. 1. According to the embodiment, constrained optimization solver module 210 can receive demand model data 220, control input data 230, and business rules input data 240, and generate primary output 250 (and optionally generate derived output 260 in one embodiment). In one embodiment, demand model data 220, control input data 230, and business rules input data 240 can be input by an end user. These schema components will now be described in greater detail.

Constrained optimization solver module 210 is a module that includes functionality for generating one or more prices for one or more items. More specifically, constrained optimization solver module 210 includes one or more embedded demand models, and a constrained multi-objective optimization model, combined with one or more mathematical optimization algorithms, that can generate one or more optimal prices for one or more items based on a selected embedded demand model. According to the embodiment, constrained optimization solver module 210 receives demand model data 220, control input data 230, and business rules input data 240 as input, and generates primary output 250 (and optionally derived output 260) as output based on the received input utilizing a selected embedded demand model, and a constrained multi-objective optimization model, combined with one or more mathematical optimization algorithms. In accordance with the embodiment, primary output 250 includes one or more optimal prices for one or more items.

A demand model is a mathematical representation of expected demand for a set of one or more items as a function of price effect parameters. According to an embodiment, constrained optimization solver module 210 has one or more demand models that can be selected by an end user, for example, using one or more numerical values that identify a demand model choice. One example of a demand model is a cross-elasticity model. A cross-elasticity model is a type of demand model where a price effect is modeled using a set of one or more scalar numerical parameters that represent a sales rate gain or loss for an item due to price changes for the same item (i.e., own elasticity) or another item (i.e., cross-elasticity). Another example of a demand model is a hybrid multinomial logit ("MNL") model. A MNL model is a type of demand model where a price effect is modeled using: a single numerical parameter that represents a sales rate gain or loss for a set of one or more items due to a change in an average price of the one or more items (i.e., category-level elasticity); and a set of one or more scalar numerical parameters that represent each item's market share (i.e., relative attractiveness) gain or loss due to price changes in any of the items.

A constrained multi-objective optimization model is a mathematical representation of an overall pricing decision based on specific input that constrained optimization solver module 210 receives. According to the embodiment, the specific input includes demand model data 220, control input data 230, and business rules input data 240. The optimization model is described below in greater detail in relation to FIG. 3. The optimization model includes one or more algorithms that process the specified input in order to generate output.

According to the embodiment, the output includes primary output 250 (and optionally, derived output 260).

Demand model data 220 is data that can include one or more values, where each value represents financial information that relates to one or more items. An item can be any good or product that can be sold by a retailer, such as a retail item. Demand model data 220 can be utilized by a demand model utilized by constrained optimization solver module 210.

According to an embodiment, demand model data 220 can include demand model parameters, price zone data, and demand group data. Demand model parameters are parameters that can be utilized by a demand model utilized by constrained optimization solver module 210. Demand model parameters can include one or more numerical values. According to an embodiment, depending on the demand model utilized by constrained optimization solver module 210, the demand model parameters can include either cross-elasticity model parameters or MNL model parameters. Cross-elasticity model parameters and MNL model parameters are described below in greater detail in relation to FIG. 3.

Price zone data is data that is associated with a price zone, which is a set of one or more store locations where one or more items can be sold. Price zone data can include one or more numerical values. According to an embodiment, price zone data can include item data, unit cost data, and original price data. As previously described, item data identifies any good or product that can be sold by a retailer, such as a retail item. As an example, item data can identify a stock-keeping unit ("SKU") of an item. As another example, item data can identify a class. Unit cost data identifies a cost per unit for an item at a specific location. Original price data identifies an initial (i.e., original) price for an item. In one embodiment, in a given price zone, each item of the one or more items can have an identical original price for every location within the price zone.

Demand group data is data that is associated with a demand group, which is a set of one or more items. In one embodiment, a demand group can be a category of items. Demand group data can include one or more numerical values that represent financial information that is observable and that can be quantified by an end user, for a set of one or more item prices. Demand group data can be calculated for a single item or aggregated over all items in a demand group. Demand group data can also be aggregated over all locations in a price zone. According to an embodiment, demand group data can include sales data, revenue data, competitor revenue data, cost data, margin data, and consumer price index ("CPI") data.

Sales data is data that identifies an expected demand of an item at a specific level of aggregation, and generally over a specific period of time. Revenue data is data that identifies a multiplicative product of an item's sales and the item's price, and is generally summed up to a specific level of aggregation. Revenue data can be associated with either a single item or a plurality of items. Competitor revenue data is data that identifies a multiplicative product of a competitor item's sales and the competitor item's price, and is also generally summed up to a specific level of aggregation. Like revenue data, competitor revenue data can be associated with a plurality of items rather than a single item. Cost data is data that identifies a multiplicative product of an item's sales and the item's unit cost, and is also generally summed up to a specific level of aggregation. Margin data is data that identifies a value defined as (revenue−cost) at a specific level of aggregation. CPI data is data that identifies a value defined as 100*(revenue−competitor revenue)/(competitor revenue).

Control input data 230 is data that can include one or more numerical and Boolean values that, in part, control the operation of constrained optimization solver module 210. According to an embodiment, control input data 230 includes one or more numerical values that identify a demand model choice. A demand model choice identifies which demand model constrained optimization solver module 210 can utilize. According to the embodiment, control input data 230 also includes one or more Boolean values that identify a mode choice. A mode choice identifies a mode that constrained optimization solver module 210 operates in. For example, constrained optimization solver module 210 can operate in an optimization mode where constrained optimization solver module 210 generates a set of one or more optimal prices for one or more items, or can operate in a validation mode where constrained optimization solver module 210 validates a set of one or more user-defined prices for one or more items, according to the mode choice.

Business rules input data 240 is data that defines one or more business rules applied by constrained optimization solver module 210. According to an embodiment, business rules input data 240 can include one or more constraints, one or more objectives, one or more global constraints, and one or more goals.

A constraint is a mathematical representation of one or more pricing restrictions in a form of an equality or inequality. An equality, or inequality, can be represented as a direct function of one or more variables. The function can be a linear or nonlinear combination of the variables, or its derivatives, and is denoted as the "left hand side" or "LHS" of the equality, or inequality.

In addition to a function, the equality, or inequality, can be represented by a restriction on the values that the function can take. The restriction is a combination of a comparison operator, and a numerical parameter, which the value from the function is checked against. The restriction is denoted as the "right hand side" or "RHS" of the equality, or inequality. The comparator can be one of the following types: "less than or equal to;" "greater than or equal to;" and "equal to." Thus, a general form of a constraint is: LHS <comparator> RHS.

A constraint also includes one or more constraint coefficients, which are numerical parameters used to evaluate whether a constraint is satisfied. A constraint is satisfied when a numerical evaluation of the function of the constrain satisfies a logical condition specified by the restriction of the constraint within a pre-determined level of error or "tolerance." Thus, there are two types of constraint satisfaction: absolute constraint satisfaction and constraint satisfaction within tolerance. Absolute constraint satisfaction is achieved if the constraint is satisfied at zero tolerance (e.g., LHS=RHS, in the case where the constraint takes the form of an equality). Constraint satisfaction within tolerance is achieved when the constraint is satisfied within some numerical nonzero tolerance (e.g., LHS=RHS±tolerance, in the case where the constraint takes the form of an equality).

There can be two types of constraints: a hard constraint and a soft constraint. A hard constraint is a constraint that must be satisfied for any generated set of one or more prices to be considered optimal prices. In contrast, a soft constraint is a constraint that is expected to be satisfied by the generated set of one or more prices, but which may be violated (i.e., a constraint satisfaction error can be greater than a pre-determined tolerance for the constraint), if the overall solution quality is sufficiently upgraded in terms of other hard and soft constraints.

An objective is a mathematical representation (such as a function) of a primary business objective. In one embodiment, an objective is treated as a single soft constraint. According to this embodiment, a LHS for an objective can be the objective itself. A comparator for an objective can be specified as "greater than or equal to." A RHS for an objective can be specified to be a very large positive number. Consequently, according to the embodiment, constrained optimization solver module 210 can attempt to maximize an objective by attempting to reduce an equivalent soft constraint error.

A global constraint is a special type of objective that can support a weighted combination of one or more business objectives that are derived from decision variables and a chosen demand model. Example of global constraints include total sales, total revenue, gross margin, and total CPI. Total sales is an expected demand for a demand group at one or more generated optimal prices. Total revenue is a sum of a multiplicative product of a demand for an item and a generated optimal price for the item, over a demand group. Gross margin is a difference of a total revenue and total cost (i.e., total revenue–total cost). Total CPI is defined as 100*(total revenue–competitor revenue)/competitor revenue, where competitor revenue is a sum of a demand for an item and a competitor's price for the item, over a demand group.

A goal is a mathematical representation (such as a function) of a secondary business objective. In one embodiment, a goal is treated as a single soft constraint. According to the embodiment, one or more goals can be used in tandem with an objective to enable constrained optimization solver module 210 to solve a multi-objective optimization problem. Thus, in a presence of multiple solutions that are roughly of the same quality in terms of an objective, constrained optimization solver module 210 can select an optimal solution that best satisfies the one or more goals.

Primary output 250 includes one or more optimal prices for one or more items generated by constrained optimization solver module 210. According to the embodiment, the one or more optimal prices includes an optimal price for each item of a demand group. In accordance with the embodiment, each optimal price is an optimal price generated by constrained optimization solver module 210 for each item in light of demand model data 220, control input data 230, and business rules input data 240. Thus, each optimal price generated by constrained optimization solver module 210 can take into consideration price zone data, demand group data, constraints, objectives, and goals input by an end user, as well as a demand model selected by the end user.

Primary output 250 can also include diagnostic data, which is data that identifies characteristics regarding an operation of the optimization model of constrained optimization solver module 210. According to an embodiment, diagnostic data can include an optimization status, an optimization log, a solver return code, and constraint violation diagnostics. An optimization status is a text string that describes a final state of constrained optimization solver module 210. An optimization log is a text-string stream that contains a collection of intermediate results within an operation of constrained optimization solver module 210 which can be used for debugging and quality control tracking. A solver return code is a numerical value that generally denotes the success or the type of failure or error encountered. Constraint violation diagnostics are one or more Boolean indicators that provide information regarding the type and location of constraint violations, if any.

According to an embodiment, constrained optimization solver module 210 can optionally generate derived output 260. Derived output 260 can include optimal demand-related metrics for each item of a demand group that are based on the generated optimal prices. In one embodiment, derived output can include one or more numerical values for the following metrics: revenue, competitor revenue, cost, margin, and CPI.

In an embodiment, the schema of constrained optimization solver module 210 optionally also includes demand models 270, and user interfaces 280 and 290. According to the embodiment, demand models 270 represent additional demand models that can be loaded by constrained optimization solver module 210. Demand models 270 can be stored within a back-end software module (not shown in FIG. 2), such as CE and RPAS. User interface 280 allows constrained optimization solver module 210 to interact with the back-end software module where demand modules 270 are stored. User interface 290 allows the generated output to be displayed to an end user.

Figure 3:
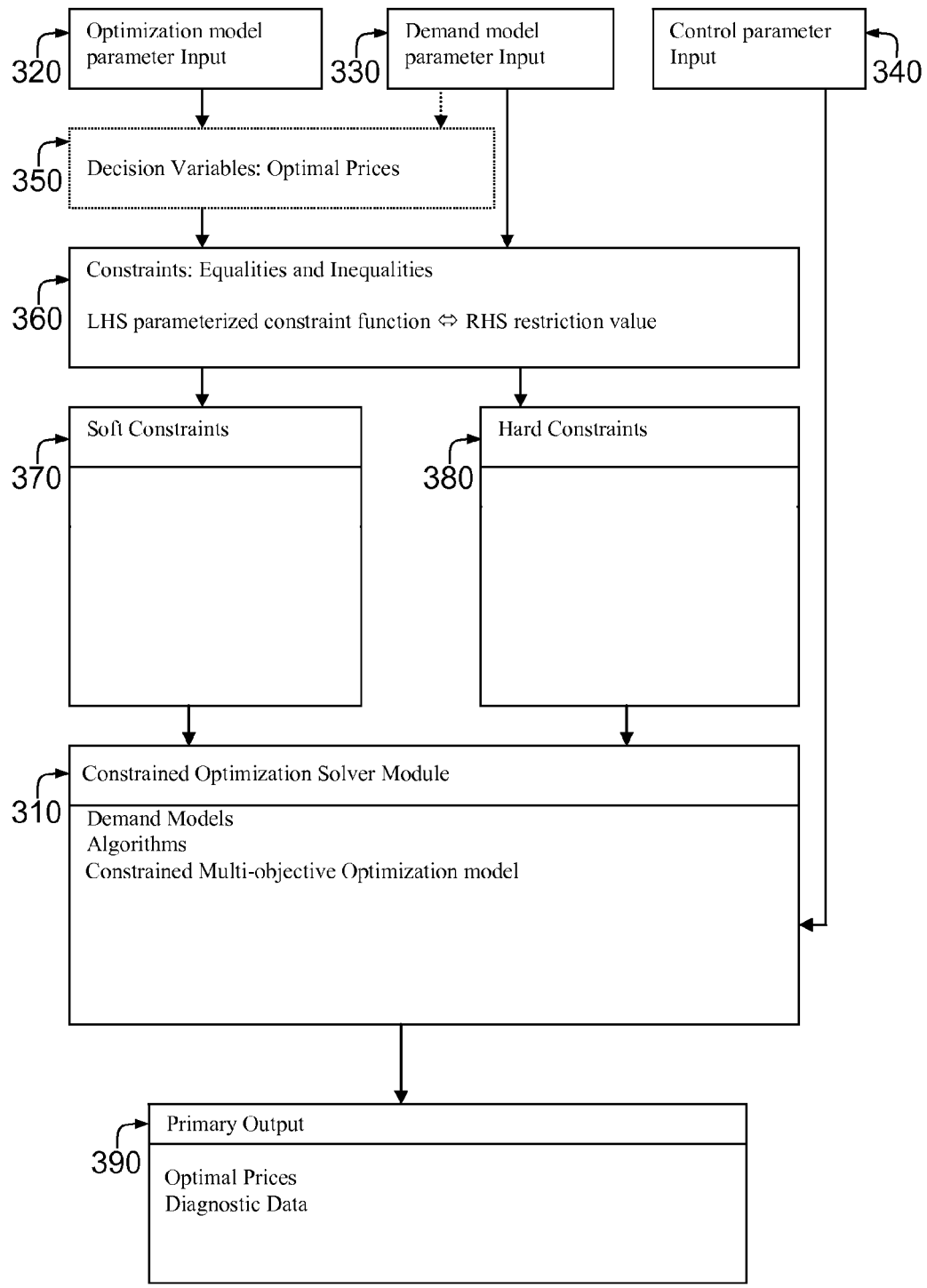
FIG. 3 illustrates a schema of an optimization model utilized by a constrained optimization solver module, according to an embodiment of the invention.

FIG. 3 illustrates a schema of an optimization model utilized by a constrained optimization solver module 310, according to an embodiment of the invention. In one embodiment, constrained optimization solver module 310 is similar to constrained optimization solver module 16 of FIG. 1. According to the embodiment, constrained optimization solver module 310 can receive optimization model parameter input 320, demand model parameter input 330, and control parameter input 340, and generate primary output 390. In one embodiment, optimization model parameter input 320, demand model parameter input 330, and control parameter input 340 can be input by an end user. These schema components will now be described in greater detail.

Similar to constrained optimization solver module 210 of FIG. 2, constrained optimization solver module 310 is a module that includes functionality for generating one or more prices for one or more items. Also similar to constrained optimization solver module 210 of FIG. 2, constrained optimization solver module 310 includes one or more embedded demand models, and a constrained multi-objective optimization model, combined with one or more mathematical optimization algorithms, that can generate one or more optimal prices for one or more items based on a selected embedded demand model. According to the embodiment, constrained optimization solver module 310 receives optimization model parameter input 320, demand model parameter input 330, and control parameter input 340 as input, and generates primary output 390 as output based on the received input utilizing a selected embedded demand model, and a constrained multi-objective optimization model, combined with one or more mathematical optimization algorithms. In accordance with the embodiment, primary output 390 includes one or more optimal prices for one or more items.

Optimization model parameter input 320 includes objective parameters, goal parameters, and constraint parameters. Objective parameters can include one or more numerical values for one or more metrics supported by the objective. Goal parameters can include one or more numerical values for one or more goals that are represented as soft constraints. Constraint parameters can include one or more numeric values used to specify constraints for an optimization model implemented by constrained optimization solver module 310.

According to an embodiment, constraint parameters can include range constraint parameters, price change limit parameters, inter-item constraint parameters, and price ladder constraint parameters. A range constraint parameter is a numerical value used to limit a price change variation for an item. A price change limit parameter is a numerical value expressed as a percentage of a total number of items in a demand group that are allowed to have a generated optimal price that is different from an original price. An inter-item constraint parameter is a set of one or more numerical values that can be used to model inter-item pricing restrictions (e.g.

Price of item 1=price of item 2—0.50). A price ladder constraint parameter is a set of one or more numerical values that represent possible prices for an item. When a price ladder constraint parameter is provided for an item, a generated optimal price is a price selected from one of the possible prices represents by the price ladder constraint parameter.

Optimization model parameter input 320 also includes a parameter representing a number of locations in a price zone, and a parameter representing a number of items in a demand group.

Demand model parameter input 330 includes one or more parameters that can be utilized by a demand model utilized by constrained optimization solver module 310. Demand model parameters can include one or more numerical values. According to an embodiment, depending on the demand model utilized by constrained optimization solver module 310, the demand model parameters can include either cross-elasticity model parameters or MNL model parameters.

According to an embodiment, cross-elasticity model parameters are numerical values for a cross-elasticity square matrix that is utilized to specify a cross-elasticity demand model, with a number of rows and a number of columns equal to a number of items in a demand group. Also according to the embodiment, MNL model parameters are numerical values utilized to specify a MNL-based demand model. There can be two types of MNL model parameters: utility coefficient parameters and category-level elasticity parameters. There can be two sets of utility coefficient parameters (designated alpha and beta), each having a dimension that equals a number of items in a demand group. There can also be a category-level elasticity parameter which is a single numerical value that models an overall demand-group-level demand.

Control parameter input 340 includes one or more control parameters. Control parameters can include a demand model choice parameter and a mode choice parameter. As previously described in relation to FIG. 2, a demand model choice parameter is a numeric value identifies which demand model constrained optimization solver module 310 can utilize. As also previously described in relation to FIG. 2, a mode choice parameter is a Boolean value that identifies a mode that constrained optimization solver module 310 operates in. For example, constrained optimization solver module 310 can operate in an optimization mode where constrained optimization solver module 310 generates a set of one or more optimal prices for one or more items, or can operate in a validation mode where constrained optimization solver module 310 validates a set of one or more user-defined prices for one or more items, according to the mode choice.

Decision variables 350 are variables that represent one or more optimal prices for one or more items that are to be determined by constrained optimization solver module 310. Primary output 390, described below in greater detail, is comprised of the values for decision variables 350.

Constraints 360, as previously described, are mathematical representations of pricing restrictions in a form of an inequality or equality. As also previously described, constraints 360 can take the form of "LHS <comparator> RHS," where LHS represents a function, <comparator> represents one of "less than or equal to," "greater than or equal to," or "equal to," and RHS represents a restriction value.

As illustrated in FIG. 3, constraints 360 can be divided into two categories: soft constraints 370 and hard constraints 380. As previously described, a hard constraint is a constraint that must be satisfied absolutely or within a tolerance, whereas a soft constraint is a constraint that can be violated, if the overall solution quality is sufficiently upgraded in terms of other hard and soft constraints. The division of constraints 360 into soft constraints 370 and hard constraints 380 can allow constrained optimization solver module 310 to determine which constraints can be violated, and which constraints cannot be violated, in generating one or more optimal prices for one or more items.

Primary output 390 includes one or more optimal prices for one or more items generated by constrained optimization solver module 310, similar to primary output 250 of FIG. 2. The optimal prices are described previously in relation to FIG. 2. Also similar to primary output 250 of FIG. 2, primary output 390 can also include diagnostic data. Similar to the optimal prices, the diagnostic data is described previously in relation to FIG. 2.

As previously described, an optimization model can include one or more constraints, where the constraints are prioritized constraints (i.e., are each assigned a specific priority). Each constraint of the one or more constraints may be of a specific constraint type. According to an embodiment, an end user can assign a priority for each constraint type. This priority is identified as a default priority. Also in accordance with the embodiment, an end user can override a default priority for an instance of a constraint type, and assign the constraint instance a new priority, despite the default priority assigned to the constraint type of the constraint instance. An example of constraint types that are assigned a priority is provided below:

| Constraint Type | Default Priority | Override Priority | Overall Priority |
|---|---|---|---|
| Constraint Type 1 | 1 | 1 | 1 |
| Constraint Type 2 | 2 | — | 2 |
| Constraint Type 3 | 3 | 2 | 2 |

In the above example, a priority of 1 is the highest priority, a priority of 2 is the next-highest priority after a priority of 1, and a priority of 3 is the next-highest priority after a priority of 1 and a priority of 2. As shown in the above example, an instance of constraint type 1 (i.e., a first constraint) is assigned a default priority of 1. The default priority of the first constraint is overridden, but the first constraint is again assigned an override priority of 1. Thus, the overall priority of the first constraint is 1. Likewise, an instance of constraint type 2 (i.e., a second constraint) is assigned a default priority of 2. The default priority of the second constraint is not overridden. Thus, the overall priority of the second constraint is 2. Finally, an instance of constraint type 3 (i.e., a third constraint) is assigned a default priority of 3. The default priority of the third constraint is overridden, and the third constraint is assigned an override priority of 2. Thus, the overall priority of the third constraint is 2.

According to an embodiment, a constrained optimization solver module (such as constrained optimization solver module 16 of FIG. 1) receives one or more prioritized constraints (i.e., one or more constraints assigned a priority), in addition to other input previously described in relation to FIGS. 2 and 3, and preprocesses the prioritized constraints in their priority order (i.e., preprocesses the highest priority constraints first, and then preprocesses the remaining priority constraints in a descending order of priority). The prioritized constraints are preprocessed in order to resolve conflicts and to determine a set of one or more prices (i.e., optimal prices) that satisfies, to the best extent possible, the prioritized constraints.

More specifically, according to the embodiment, for each prioritized constraint, the constrained optimization solver module selects the prioritized constraint and adds it to an optimization model. The newly-added prioritized constraint is treated as a hard constraint within the optimization model, and the constrained optimization solver module evaluates the optimization model, including the newly-added prioritized constraint, to see if one or more feasible solutions can be generated. According to the embodiment, a feasible solution includes a set of one or more prices generated by the constrained optimization solver module, where the one or more prices satisfy all hard constraints of the optimization model, including the newly-added prioritized constraint, and as many soft constraints of the optimization model as possible. If a feasible solution can be found, the newly-added prioritized constraint is defined as a hard constraint within the optimization model. This means that, in any subsequent evaluation of the optimization model, a set of one or more prices generated by the constrained optimization solver module must satisfy the newly-added prioritized constraint in order for the set to be considered a feasible solution. Otherwise, if a feasible solution can not be found, the newly-added prioritized constraint is defined as a soft constraint within the optimization model. This means that, in any subsequent evaluation of the optimization model, a set of one or more prices generated by the constrained optimization solver module does not necessarily have to satisfy the newly-added prioritized constraint in order for the set to be considered a feasible solution. This process is repeated for each prioritized constraint until each prioritized constraint is either defined as a hard constraint or a soft constraint. Thus, according to the embodiment, it is possible for a prioritized constraint assigned a higher priority to be defined as a soft constraint, and for a prioritized constraint assigned a lower priority to be defined as a hard constraint. In one embodiment, any prioritized constraint assigned the highest priority (e.g., priority 1), is automatically defined as a hard constraint. Thus, in this embodiment, no preprocessing in required for any prioritized constraint assigned the highest priority (e.g., priority 1), as the prioritized constraint is automatically defined as a hard constraint.

Figure 4:
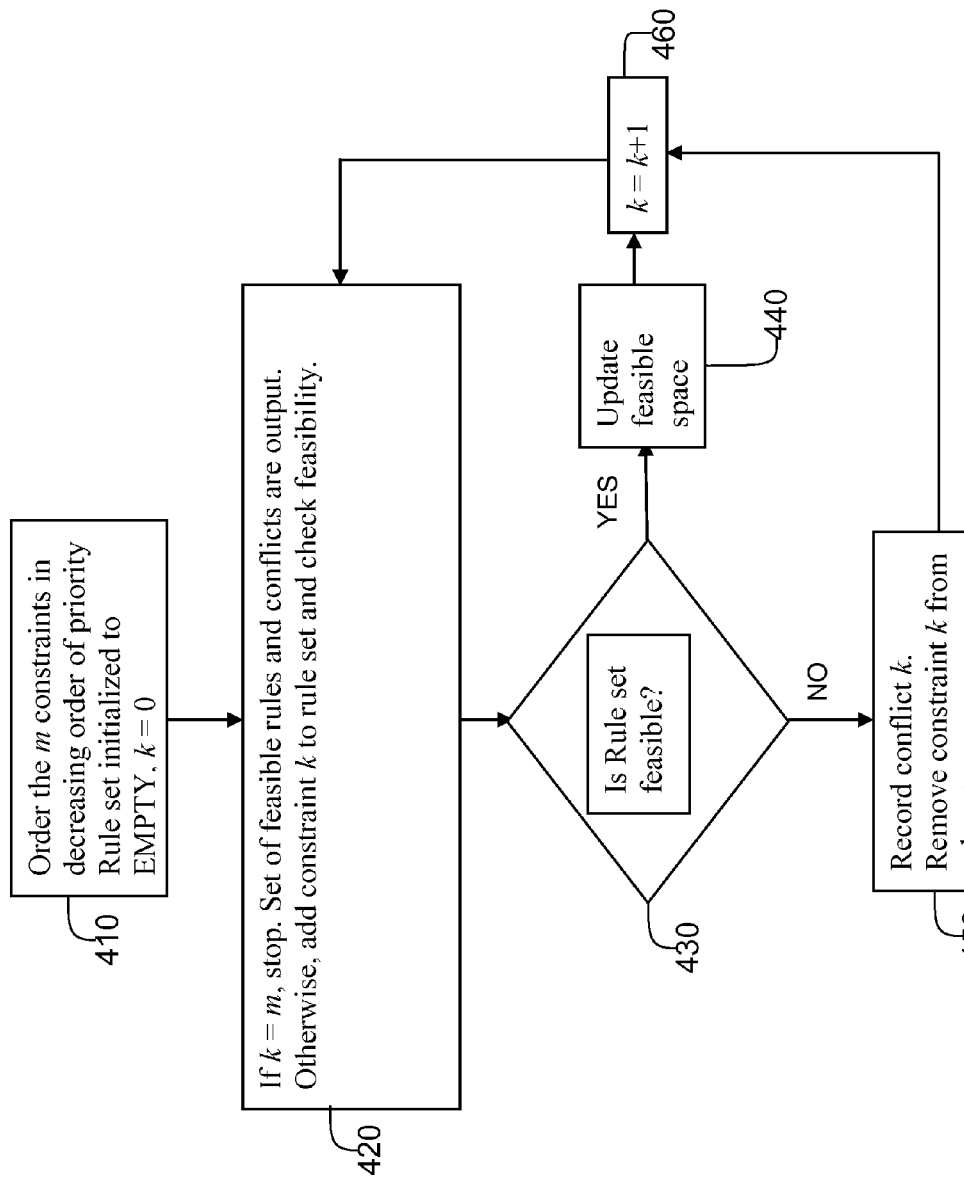
FIG. 4 illustrates a flow diagram for resolving conflicts of prioritized constraints, according to an embodiment of the invention.
Figure 5:
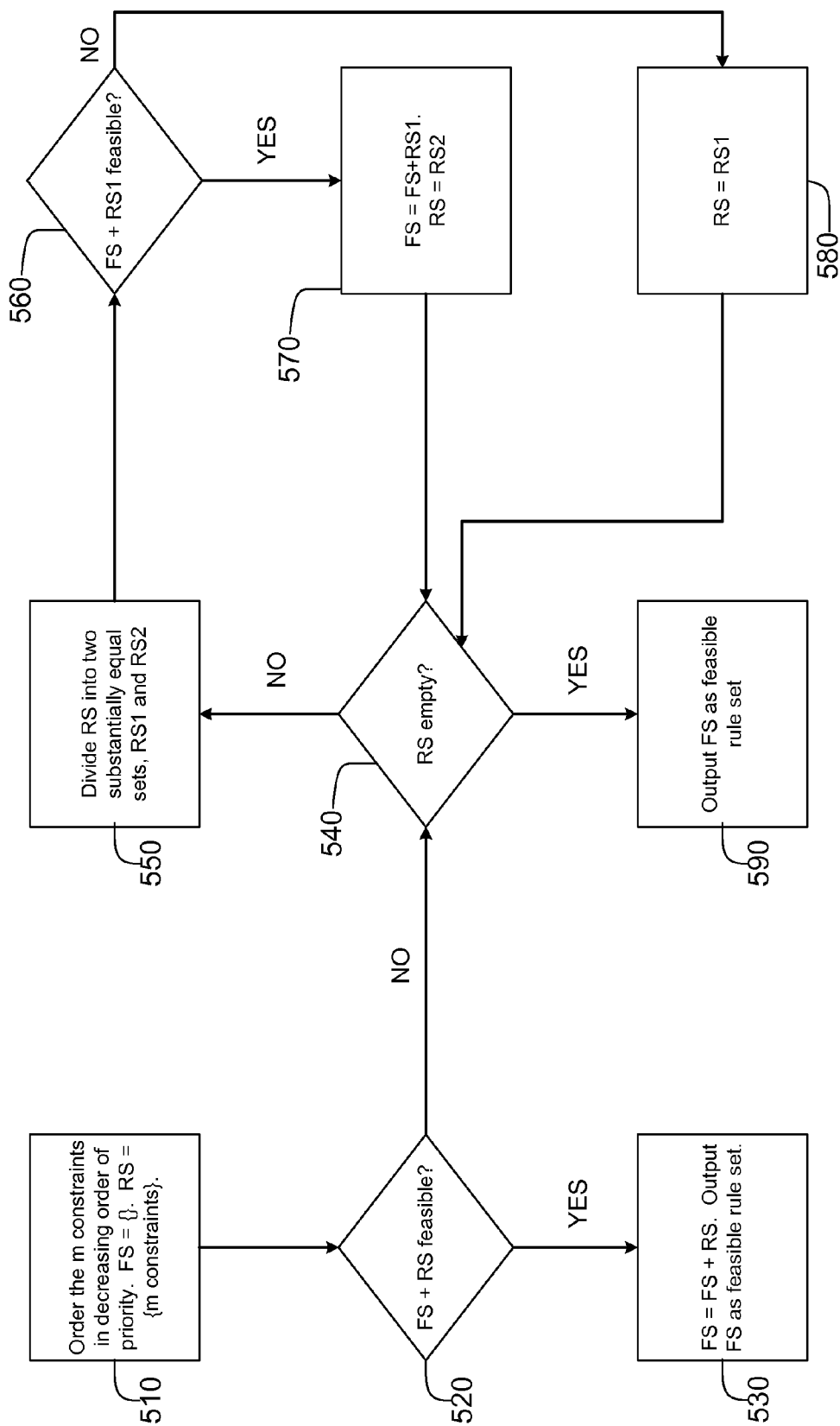
FIG. 5 illustrates a flow diagram for resolving conflicts of prioritized constraints, according to another embodiment of the invention.
Figure 6:
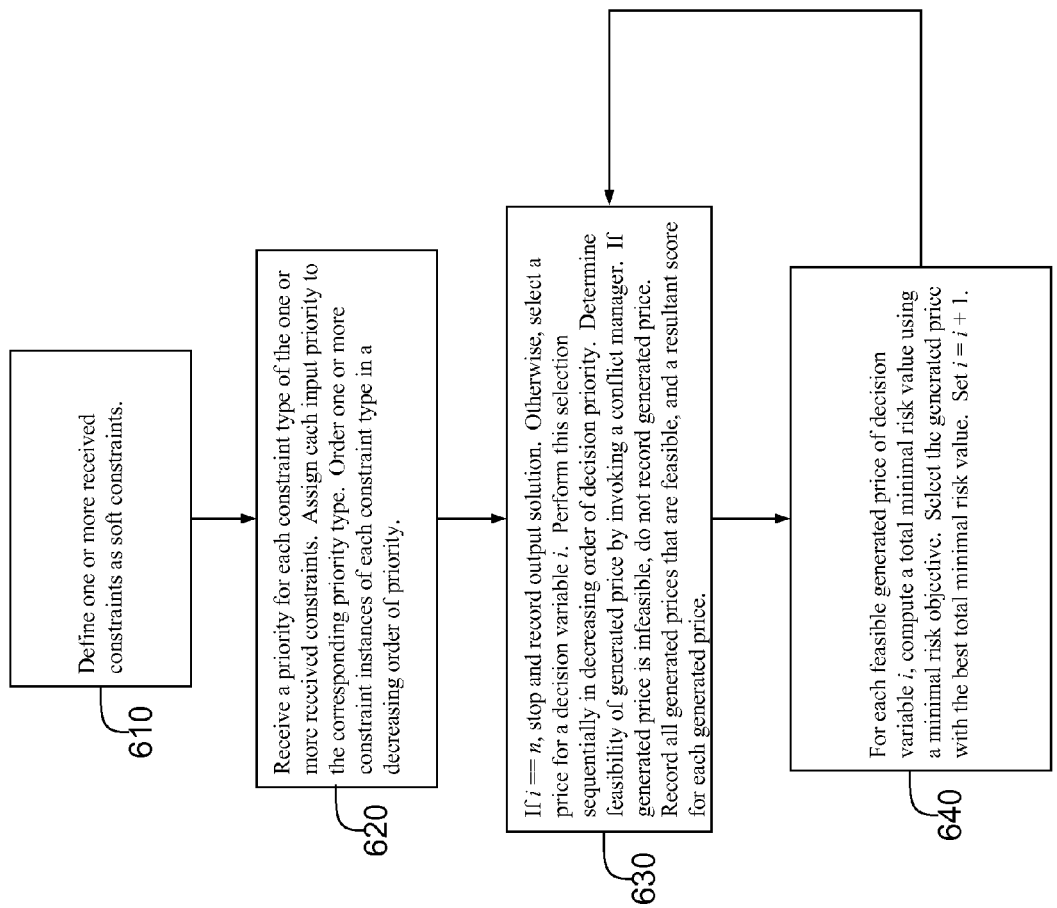
FIG. 6 illustrates a flow diagram for producing a minimally disruptive optimal solution utilizing prioritized constraints, according to an embodiment of the invention.
Figure 7:
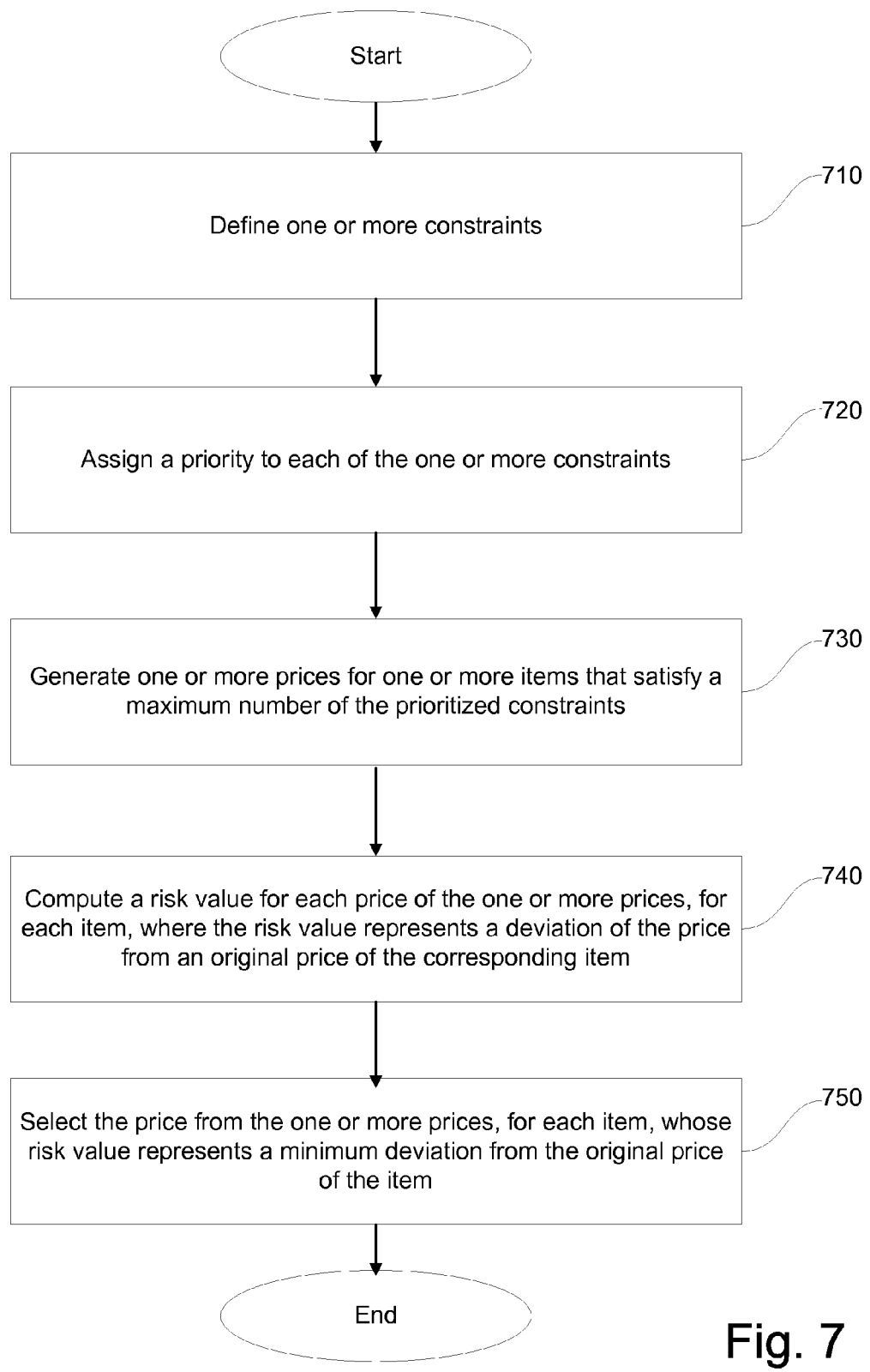
FIG. 7 illustrates a flow diagram of the functionality of a constrained optimization solver module, according to an embodiment of the invention.

FIG. 4 illustrates a flow diagram for resolving conflicts of prioritized constraints, according to an embodiment of the invention. In one embodiment, the functionality of the flow diagram of FIG. 4, and the functionality of the flow diagrams of FIGS. 5, 6, and 7, are implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. In one embodiment, the software includes a constrained optimization solver module (such as constrained optimization solver module 16 of FIG. 1).

According to the embodiment, the flow begins, and at 410, m constraints (i.e., prioritized constraints) are ordered in a decreasing order of priority, where m is a variable that represents the number of prioritized constraints that are received. A rule set, which can contain one or more constraints, is initialized to an empty set (i.e., EMPTY). A variable, k, is initialized to 0. According to the embodiment, the variable k serves as a counter, representing a number of prioritized constraints added to the rule set. The flow then proceeds to 420.

At 420, it is determined whether the variable k is equal to the variable m. If the variable k is equal to the variable m, this signifies that all of the m constraints have been evaluated. Thus, the rule set is evaluated and one or more feasible rules (i.e., constraints) are output. In addition, if any conflicts have been recorded during the flow, these conflicts are also output. Subsequently, the flow ends. If the variable k is not equal to the variable m, this signifies that not all of the m constraints have been evaluated. Thus, constraint k is added to the rule set, and the flow proceeds to 430, where the feasibility of the rule set is checked.

At 430, it is determined whether the rule set is feasible (i.e., whether there is a feasible solution that satisfies the constraints of the rule set). As previously described, constraint k is defined as a hard constraint within the rule set, and the rule set, including constraint k, is evaluated to determine if one or more feasible solutions can be generated. As also previously described, a feasible solution includes a set of one or more prices that can be generated, where the one or more prices satisfy all hard constraints of the rule set, including constraint k, and as many soft constraints of the rule set as possible. If the rule set is feasible, the flow proceeds to 440. If the rule set is not feasible, the flow proceeds to 450.

At 440, a feasible space is updated. According to the embodiment, a feasible space include one or more hard constraints, and where one or more feasible solutions exist that satisfy the one or more hard constraints. Thus, according to the embodiment, constraint k is defined as a hard constraint and added to the feasible space. The flow then proceeds to 460.

At 450, a conflict k is reported. The conflict k represents that constraint k prevents a feasible solution from being determined when constraint k is treated as a hard constraint. Constraint k is subsequently removed from the rule set. Thus, according to the embodiment, constraint k is defined as a soft constraint. The flow then proceeds to 460.

At 460, the variable k is incremented by one. The flow then proceeds to 420, where the flow described above is repeated. The flow repeats until the variable k equals the variable m.

According to an embodiment, the one or more prioritized constraints that are output from the rule set are defined as hard constraints. Also according to the embodiment, any prioritized constraints that are not part of the rule set are defined as soft constraints. Thus, after the flow ends, each prioritized constraint is either defined as a hard constraint of a soft constraint.

FIG. 5 illustrates a flow diagram for resolving conflicts of prioritized constraints, according to another embodiment of the invention. According to this alternate embodiment, as will be described below in greater detail, prioritized constraints with the highest priority are added to a feasible rule set until the feasible rule set includes a maximum number of prioritized constraints and can generate a feasible solution. As previously described, a feasible solution includes a set of one or more prices that can be generated, where the one or more prices satisfy all hard constraints of the feasible rule set, and as many soft constraints of the feasible rule set as possible. In one embodiment, the flow is performed by a constrained optimization solver module (such as constrained optimization solver module 16 of FIG. 1).

According to the embodiment, the flow begins, and at 510, m constraints (i.e., prioritized constraints) are ordered in a decreasing order of priority, where m is a variable that represents the number of prioritized constraints that are received. A feasible rule set (identified in FIG. 5 as FS) is initialized to an empty set (identified in FIG. 5 as { }). A checking rule set (identified in FIG. 5 as RS) is initialized to include all m constraints. The flow then proceeds to 520.

At 520, it is determined whether a combination of the feasible rule set and the checking rule set is feasible (i.e., whether there is a feasible solution that satisfies the constraints of the feasible rule set and the checking rule set). As previously described, the constraints within each rule set are treated as hard constraints within each rule set, and the combination of the feasible rule set and the checking rule set is evaluated to see if one or more feasible solutions can be generated. As also previously described, a feasible solution includes a set of one or more prices that can be generated, where the one or more prices satisfy all hard constraints of each rule set, and as many soft constraints of each rule set as possible. If the combination of the feasible rule set and the checking rule set is feasible, the flow proceeds to 530. If the combination of the feasible rule set and the checking rule set is not feasible, the flow proceeds to 540.

At 530, the feasible rule set is modified to equal the combination of the feasible rule set and the checking rule set. The feasible rule set is then output as a solution. Subsequently, the flow ends.

At 540, it is determined whether the checking rule set is empty (i.e., whether the checking rule set contains any prioritized constraints). If the checking rule set is not empty, the flow proceeds to 550. If the checking rule set is empty, the flow proceeds to 590.

At 550, the checking rule set is divided into two substantially equal checking rule helper sets, a first checking rule helper set (identified in FIG. 5 as RS1), and a second checking rule helper set (identified in FIG. 5 as RS2).

What is meant by "substantially equal" is that a difference between a number of constraints in the first checking rule helper set and a number of constraints in the second checking rule helper set cannot be greater than one. As a non-limiting example, if the checking rule set includes four constraints, then both the first checking rule helper set and the second checking rule helper set can each include two constraints. As another non-limiting example, if the checking rule set includes five constraints, then the first checking rule helper set can include three constraints, and the second checking rule helper set can include two constraints. In this non-limiting example, the first checking rule helper set can include two constraints, and the second checking rule helper set can include three constraints.

At 560, it is determined whether a combination of the feasible rule set and the first checking rule helper set is feasible (i.e., whether there is a feasible solution that satisfies the constraints of the feasible rule set and the first checking rule helper set). If the combination of the feasible rule set and the first checking rule helper set is feasible, the flow proceeds to 570. If the combination of the feasible rule set and the first checking rule helper set is not feasible, the flow proceeds to 580.

At 570, the feasible rule set is modified to equal the combination of the feasible rule set and the first checking rule helper set. The checking rule set is modified to equal the second checking rule helper set. The flow then proceeds to 540, where the flow described above is repeated.

At 580, the checking rule set is modified to equal the first checking rule helper set. The flow then proceeds to 540, where the flow described above is repeated.

At 590, the feasible rule set is output as a solution. Subsequently, the flow ends.

According to an embodiment, the one or more prioritized constraints that are within the output feasible rule set are defined as hard constraints. Also according to the embodiment, any prioritized constraints that are not part of the output feasible rule set are defined as soft constraints. Thus, after the flow ends, each prioritized constraint is either defined as a hard constraint of a soft constraint.

As previously described, a constrained optimization solver module (such as constrained optimization solver module 16 of FIG. 1) can receive one or more objectives as input, where an objective is a mathematical representation (such as a function) of a primary business objective. The constrained optimization solver module can then attempt to maximize the one or more objectives. According to an embodiment, a minimal disruption (i.e., minimal risk) objective can be defined for a constrained optimization solver module, where the minimal risk objective can minimize a disruption of an existing business plan (such as a set of one or more original prices for one or more items). Therefore, according to the embodiment, a set of one or more optimal prices generated by a constrained optimization solver module can be consistent with a pre-existing business plan.

According to the embodiment, a minimal risk objective introduces a concept of a risk value to penalize a deviation of one or more optimal prices from one or more original prices. In one embodiment, a set of one or more anchor prices, which correspond to one or more items, can be received by a constrained optimization solver module as additional input, and serve as the one or more prices that the one or more optimal prices are compared to. In an alternate embodiment, if no anchor prices are provided, the constrained optimization solver module can utilize one or more original prices, where each original price corresponds to each item, as the one or more prices that the one or more optimal prices are compared to. Thus, stated another way, the constrained optimization solver module can utilize one of the following to calculate a minimal risk objective: (1) a set of one or more anchor prices, where each anchor price corresponds to an item, where the constrained optimization solver module receives one or more anchor prices; or (2) a set of one or more original prices, where each original price corresponds to an item, where the constrained optimization solver module does not receive one or more anchor prices.

Also, in one embodiment, a set of one or more historical lowest prices, and a set of one or more historical highest prices, can be received by a constrained optimization solver module as additional input, where the set of one or more historical lowest prices, and the set of one or more historical highest prices, can be utilized, along with the one or more original prices, to minimize risk using the minimal risk objective.

In one embodiment, in addition to utilizing a minimal risk objective, an end user can also minimize risk as a minimal risk constraint utilizing a tolerance. According to the embodiment, a minimal risk constraint can be provided, similar to a minimal risk objective. The minimal risk constraint can be treated as a soft constraint, where a constrained optimization solver module penalizes an objective function if the minimal risk constraint is violated. An end user can specify either a high tolerance, a medium tolerance, or a low tolerance, for the minimal risk constraint. An end user can, in the alternate, specify that the minimal risk constraint is to be turned off. The constrained optimization solver module can map the setting specified by the end user to a numerical value that can be stored as a parameter. In one embodiment, a minimal risk constraint can be a global constraint, similar to a margin global constraint, a revenue global constraint, a sales global constraint, and a CPI global constraint. The minimal risk objective and the minimal risk constraint will now be described in greater detail.

According to an embodiment, an objective function of a constrained optimization solver module (such as constrained optimization solver module 16 of FIG. 1) can be updated with a minimal risk objective appended to an existing objective function. The computation of a risk value performed by the minimal risk objective can be one of two versions depending on what type of input the constrained optimization solver module receives.

In one embodiment, the computation of a risk value performed by the minimal risk objective is a non-breakpoint version, as described below in greater detail. The non-breakpoint version can be used when only one or more original prices (or anchor prices) are received as input.

In another embodiment, the computation of a risk value performed by the minimal risk objective is a breakpoint version, as also described below in greater detail. The breakpoint version can be used when one or more historical lowest prices, and one or more historical highest prices, are received as input, in addition to one or more original prices (or anchor prices).

According to an embodiment where a computation of a risk value for a minimal risk objective is a non-breakpoint version, a price range space (i.e., a range of one or more prices generated by a constrained optimization solver module) can be divided into the following two ranges:

Range 1: negative infinity to anchor price $(-\infty, a_i)$ with parameters $(W_1, \rho_1)$
Range 2: original price (or anchor price) to infinity $(a_i, \infty)$ with parameters $(W_2, \rho_2)$ Furthermore, according to the embodiment, a risk value R can be defined using the following equation:

$$R = W_0 \sum_{i=1}^{N} (p_i - p_i^0)^2 + \begin{cases} W_1 \sum_{i=1}^{N} s_i(a_i - p_i)_+^{\rho_1} & \text{if } p_i <= a_i \\ W_2 \sum_{i=1}^{N} s_i(p_i - a_i)_+^{\rho_2} & \text{if } p_i > a_i \end{cases}$$

where $p_i$ is a price generated by a constrained optimization solver module for item i, $a_i$ is an anchor price for item i, $p_i^0$ is an original price for item i, $s_i$ is an optimal volume for item i, $\rho_1$ and $\rho_2$ are parameters that can be internally assigned numerical values between 1 and 2, $W_k$, where k=0, 1, 2, are objective-weights for each of the three risk components that can be internally assigned numerical values, and the notation (x)=Max(0,x).

As seen in the above equation, risk value R comprises three summations: a first summation involving objective-weight $W_0$, a second summation involving objective-weight $W_1$, and a third summation involving objective-weight $W_2$. The first summation computes a risk value for one or more optimal prices that are each either above, below, or equal to one or more original prices. The second summation computes a risk value for one or more optimal prices that are each below, or equal to, one or more anchor prices. The third summation computes a risk value for one or more optimal prices that are each above one or more anchor prices.

According to the embodiment, by assigning different numerical values to parameters $\rho_1$ and $\rho_2$, and by assigning different numerical values to objective-weights $W_k$, where k=0, 1, 2, the minimal risk objective can increase or decrease a risk value associated with a specific difference in price. Furthermore, by calculating a risk value for each price of the one or more optimal prices generated by a constrained optimization solver module, the minimal risk objective can help determine which optimal price produces a smallest overall risk, and can select that optimal price and output the optimal price as a solution. The minimal risk objective can perform this functionality for each optimal price of one or more optimal prices generated by the constrained optimization solver module for each item, and thus, can assist in generating one or more optimal prices for one or more items.

According to an embodiment where a computation of a risk value for a minimal risk objective is a breakpoint version, a price range space is divided into the following four ranges:

Range 1: negative infinity to historical lowest price $(-\infty, I_i)$ with parameters $(W_1, \rho_1, \rho_2)$
Range 2: historical lowest price to anchor price $(I_i, a_i)$ with parameters $(W_2, \rho_2)$
Range 3: anchor price to historical highest price $(a_i, u_i)$ with parameters $(W_3, \rho_3)$
Range 4: historical highest price to infinity $(u_i, \infty)$ with parameters $(W_4, \rho_3, \rho_4)$ Furthermore, according to the embodiment, risk value R is defined using the following equation:

$$R = W_0 \sum_{i=1}^{N} (p_i - p_i^0)^2 +$$

$$\begin{cases} W_1 \sum_{i=1}^{N} s_i(l_i - p_i)^{\rho_1} + W_2 \sum_{i=1}^{N} s_i(a_i - l_i)^{\rho_2} & \text{if } p_i <= l_i \\ W_2 \sum_{i=1}^{N} s_i(a_i - p_i)^{\rho_2} & \text{if } a_i >= p_i > l_i \\ W_3 \sum_{i=1}^{N} s_i(p_i - a_i)^{\rho_3} & \text{if } u_i > p_i > a_i \\ W_3 \sum_{i=1}^{N} s_i(u_i - a_i)^{\rho_3} + W_4 \sum_{i=1}^{N} s_i(p_i - u_i)^{\rho_4} & \text{if } p_i >= u_i \end{cases}$$

where $p_i$ is a price generated by a constrained optimization solver module for item i, $a_i$ is an anchor price for item i, $I_i$ is a historical lowest price for item i, $u_i$ is a historical highest price for item i, $p_i^0$ is an original price for item i, $s_i$ is an optimal volume for item i, $\rho_1, \rho_2, \rho_3$, and $\rho_4$ are parameters that can be internally assigned numerical values between 1 and 2, $W_k$, where k=0, 1, 2, 3, 4, are objective-weights for each of the three risk components that can be internally assigned numerical values, and the notation (x)=Max(0,x).

The breakpoint version is similar to the non-breakpoint version, but includes more price ranges to accommodate the historical lowest prices and historical highest prices. As seen in the above equation, risk value R comprises five summations: a first summation involving objective-weight $W_0$, a second summation involving objective-weight $W_1$ and objective-weight $W_2$, a third summation involving objective-weight $W_2$, a fourth summation involving objective-weight $W_3$, and a fifth summation involving objective-weight W3 and objective-weight $W_4$. The first summation computes a risk value for one or more optimal prices that are each either above, below, or equal to, one or more original prices. The second summation computes a risk value for one or more optimal prices that are below, or equal to, one or more historically lowest prices. The third summation computes a risk value for one or more optimal prices that are each below, or equal to, one or more anchor prices, and above one or more historically lowest prices. The fourth summation computes a risk value for one or more optimal prices that are each above one or more anchor prices, and below one or more historically highest prices. The fifth summation computes a risk value for one or more optimal prices that are each above, or equal to, one or more historically highest prices.

According to the embodiment, by assigning different numerical values to parameters $\rho_1, \rho_2, \rho_3$, and $\rho_4$, and by assigning different numerical values to objective-weights $W_k$, where k=0, 1, 2, 3, 4, the minimal risk objective can increase or decrease a risk value associated with a specific difference in price. Furthermore, by calculating a risk value for each price of the one or more prices generated by a constrained optimization solver module, the minimal risk objective can help determine which price produces a smallest overall risk, and can select that price as an optimal price. The minimal risk objective can perform this functionality for each price of one or more prices generated by the constrained optimization solver module for each item, and thus, can assist in generating one or more optimal prices for one or more items.

Thus, according to an embodiment, a constrained optimization solver module can utilize a minimal risk objective to generate one or more optimal prices that satisfies global goals (such as goals associated with margin, revenue, sales, and CPI), and also minimizes risk (i.e., disruption).

According to an embodiment, a breakpoint version of a computation of a risk value can take into account one or more competitor prices, and can divide a price range space into six ranges, rather than four ranges. The six ranges are as follows:

Range 1: negative infinity to lowest competitor price

Range 2: lowest competitor price to historical lowest price

Range 3: historical lowest price to anchor price

Range 4: anchor price to historical highest price

Range 5: historical highest price to highest competitor price

Range 6: highest competitor price to infinity

According to an embodiment, each range can be represented by a pair of price values and a pair of $(W, \rho)$. Therefore, two vectors of pairs can be used to represent an entire breakpoint framework. According to the embodiment, a risk function can be cumulative (i.e., a continuous function) to ensure that a risk value at an intermediate breakpoint is consistent regardless of which range it belongs to.

As previously described, in addition to utilizing a minimal risk objective, an end user can also minimize risk as a minimal risk constraint utilizing a tolerance. According to an embodiment, a minimal risk constraint can be defined as a soft constraint, and a constrained optimization solver module (such as constrained optimization solver module 16 of FIG. 1) can penalize an objective function if the minimal risk constraint is violated. An end user can specify either a high tolerance, a medium tolerance, or a low tolerance, for the minimal risk constraint. An end user can, in the alternate, specify that the minimal risk constraint is to be turned off. According to the embodiment, the constrained optimization solver module can map the setting specified by the end user to a numerical value that can be stored as a risk tolerance parameter $R_{LIMIT}$. An example of a mapping of a setting specified by the end user to a numerical value is as follows:

a. low tolerance=1% b. medium tolerance=5% c. high tolerance=25% d. turn off minimal risk constraint=100%

One of ordinary skill in the art would readily appreciate that the above mapping is an example mapping, and that a setting specified by the end user can be mapped to any numerical value.

According to an embodiment, a relative risk can be calculated using the following formula:

$$R_{relative} = \frac{R}{\sum_{i=1}^{N} s_i(a_i)^\rho} \le R_{LIMIT} \Rightarrow R \le R_{LIMIT} * \sum_{i=1}^{N} s_i(a_i)^\rho$$

where $s_i$ is an optimal volume for item i, $a_i$ is an anchor price for item i, $\rho$ is a parameter that can be internally assigned a numerical value between 1 and 2, and R is a risk value calculated by a minimal risk objective, as previously described. A goal of the above formula, is for the constrained optimization solver module to generate one or more optimal prices that produces a risk value R that is less than a user-specified risk tolerance parameter $R_{LIMIT}$, as shown in the above formula.

According to the embodiment, a penalty for a constraint violation can also be calculated using the following formula:

$$\text{Risk\_viol} = \text{Max}\left\{0, R - R_{LIMIT} * \sum_{i=1}^{N} s_i(a_i)^\rho\right\}$$

The penalty Risk_viol can subsequently be scaled based on an assigned priority of the minimal risk constraint and subtracted from an objective function.

FIG. 6 illustrates a flow diagram for producing a minimally disruptive optimal solution utilizing prioritized constraints, according to an embodiment of the invention. In one embodiment, the flow is performed by a constrained optimization solver module (such as constrained optimization solver module 16 of FIG. 1).

At 610, one or more received constraints are defined as soft constraints. As previously described, a soft constraint is a constraint that is expected to be satisfied by a solution (i.e., a generated set of one or more prices), but which may be violated if necessary to produce a more optimal solution (i.e., a generated set of one or more optimal prices). According to the embodiment, the one or more received constraints can include one or more soft constraints, in addition to one or more hard constraints with more than two active variables. The flow then proceeds to 620.

At 620, an end user inputs a priority for each priority type of the one or more received constraints, and each input priority is assigned to the corresponding priority type. As previously described, an optimization model can include one or more constraints, where the constraints are prioritized constraints (i.e., are each assigned a specific priority). Each constraint of the one or more constraints may be of a specific constraint type, and an end user can assign a priority for each constraint type. According to the embodiment, one or more constraint instances of each constraint type are further ordered in a decreasing order of priority. In accordance with the embodiment, a variable n is defined, where n represents a number of items. Also in accordance with the embodiment, a variable i, which represents each item of the n items, is initialized to an initial value, such as 1. The flow then proceeds to 630.

At 630, a value of the variable i is compared to a value of the variable n. If the two values are equal, the flow ends, and an output solution is recorded. According to the embodiment, an output solution is comprised of one or more generate price, where each price corresponds to an item of the n items. Otherwise, if the two values are not equal, a price is generated for a decision variable i. According to the embodiment, a price is generated sequentially in decreasing order of decision priority. In accordance with the embodiment, a feasibility of the generated price is determined by invoking a conflict manager. A conflict manager, and a flow of the conflict manager, has been previously described in relation to FIG. 4, and an alternate flow of the conflict manager has also been previously described in relation to FIG. 5. If the generated price is infeasible, then the price is not recorded. According to the embodiment, a feasibility is determined for each generated price, and all generated prices that are feasible for decision variable i, and the resultant scores for each generated price, are recorded. The flow then proceeds to 630.

At 640, for each feasible generated price of decision variable i, a total minimal risk value is computed using a minimal risk objective. A minimal risk objective has been previously described. As one example, a minimal risk objective can compute a total minimal risk value using the following formula: total minimal risk value=total risk value−priority-weighted goal violations−priority-weighted soft constraint violations. A generated price is selected that has the best total minimal risk value. The variable i is subsequently incremented by 1. The flow then proceeds to 630. The operations of 630 and 640 are repeated until the variable i equals the variable n, at which the flow ends.

FIG. 7 illustrates a flow diagram of the functionality of a constrained optimization solver module according to an embodiment of the invention. In one embodiment, the flow is performed by a constrained optimization solver module (such as constrained optimization solver module 16 of FIG. 1).

At 710, one or more constraints are defined. According to the embodiment, each constraint of the one or more constraints is a mathematical representation of one or more restrictions on a price.

At 720, a priority is assigned to each of the one or more constraints. In one embodiment, the priority can be assigned to a constraint type of each of the one or more constraints. In another embodiment, the priority can be assigned to each of the one or more constraints by overriding a priority assigned to a constraint type of each of the one or more constraints.

At 730, one or more prices are generated for one or more items that satisfy a maximum number of the prioritized constraints. In one embodiment, the one or more prices are generated by incrementally adding each prioritized constraint to a rule set and evaluating the rule set. According to the embodiment, the prioritized constraints are first ordered in a decreasing order of priority. A prioritized constraint is then added to a rule set, where the rule set contains one or more constraints. The rule set is then evaluated to determine if one or more prices can be generated that satisfy the prioritized constraints contained within the rule set. If one or more prices can be generated that satisfy the prioritized constraints contained within the rule set, the prioritized constraint is defined as a hard constraint within the rule set. According to the embodiment, a hard constraint is a prioritized constraint that must be satisfied. If one or more prices cannot be generated that satisfy the prioritized constraints contained within the rule set, the prioritized constraint is removed from the rule set. The aforementioned processing is repeated for each prioritized constraint of the prioritized constraints until the rule set comprises the maximum number of the prioritized constraints.

In another embodiment, the one or more prices are generated by adding prioritized constraints with the highest priority to a feasible rule set until the feasible rule set includes a maximum number of prioritized constraints and can generate a feasible solution. According to the embodiment, the prioritized constraints are first ordered in a decreasing order of priority, similar to the previous embodiment. Subsequently, a feasible rule set is initialized to an empty set, and all the prioritized constraints are added to a checking rule set. Next, a combination of the feasible rule set and the checking rule set is evaluated to determine if one or more prices can be generated that satisfy the prioritized constraints contained within the feasible rule set and within the checking rule set. If one or more prices can be generated that satisfy the prioritized constraints contained within the feasible rule set and within the checking rule set, the feasible rule set is modified to equal the combination of the feasible rule set and the checking rule set.

If one or more prices cannot be generated that satisfy the prioritized constraints contained within the feasible rule set and within the checking rule set, the following is subsequently performed. First, if the checking rule set contains at least one prioritized constraint, the checking rule set is divided into a first checking rule helper set and a second checking rule helper set. According to the embodiment, the first checking rule helper set and the second checking rule helper set are substantially equal, as previously described. Next, a combination of the feasible rule set and the first checking rule helper set is evaluated to determine if one or more prices can be generated that satisfy the prioritized constraints contained within the feasible rule set and within the first checking rule helper set. If one or more prices can be generated that satisfy the prioritized constraints contained within the feasible rule set and within the first checking rule helper set, the feasible rule set is modified to equal the combination of the feasible rule set and the first checking rule helper set and the checking rule set is modified to equal the second checking rule helper set. However, if one or more prices cannot be generated that satisfy the prioritized constraints contained within the feasible rule set and within the first checking rule helper set, the checking rule set is modified to equal the first checking rule helper set. The dividing, evaluating, and modifying is repeated until the feasible rule set comprises the maximum number of the prioritized constraints.

At 740, a risk value is computed for each price of the one or more prices, for each item, wherein the risk value represents a deviation of the price from an original price of the corresponding item. In one embodiment, the risk value is calculated using a minimal risk objective. According to the embodiment, a range of the one or more prices is divided into two or more ranges, where each range comprises one or more parameters that are assigned numerical values and one or more objective-weights that are assigned numerical values. A difference is computed between the price and the original price of the corresponding item for each price of the one or more prices. Furthermore, a range risk value is computed for each range using the difference between the price and the original price of the corresponding item, the one or more parameters, and the one or more objective-weights. The range risk values are summed, where the risk value for each price of the one or more prices equals the sum of the range risk values.

In an alternate embodiment, the risk value is also calculated using a minimal risk constraint. According to the embodiment, a setting specified by a user is received and mapped to a numerical value. The numerical value is stored as a tolerance parameter. The tolerance parameter is subsequently used to select the price from the one or more prices, for each item, whose risk value is less than the tolerance parameter. In one embodiment, a penalty for any constraint violation is assigned when the risk value for the price is greater than the tolerance parameter. According to the embodiment, the penalty for the constraint violation can be used to modify the risk value. The resulting value can be identified as a minimal risk value.

At 750, a price is selected from the one or more prices, for each item, whose risk value represents a minimum deviation from the original price of the item. According to the embodiment, the price for each item is the optimal price for the corresponding item, as the price satisfies a maximum number of prioritized constraints and represents a minimum deviation from the original price of the corresponding item.

FIG. 8 illustrates an example risk model instance 800, according to an embodiment of the invention. Risk model instance 800 is a graphical view of risk values mapped to prices of an item, where each price has a corresponding risk value. In the illustrated embodiment of FIG. 8, a horizontal axis of risk model instance 800 represents price, and a vertical axis of risk model instance 800 represents risk (i.e., disruption). According to an embodiment, a risk value can be computed for each price, as previously described. In one embodiment, the risk value can be computed by a constrained optimization solver module (such as constrained optimization solver module 16 of FIG. 1). According to the embodiment, $a_i$ is an anchor price for an item i, $I_i$ is a historical lowest price for item i, $u_i$ is a historical highest price for item i, Abs $L_i$ is a minimum price for item i, and Abs $U_i$ is a maximum price for item i. As can be seen in FIG. 8, according to the embodiment, as a price deviates from the anchor price for item i, a corresponding risk value increases, representing the increased disruption that the price deviation results in. One of ordinary skill in the art would readily appreciate that risk model instance 800 is only an example of a risk model instance, according to an embodiment, and that, in alternate embodiments, a risk model instance can have different risk values mapped to each price, and still be within the scope of the invention.

According to an embodiment, an end user can assign priorities to one or more constraints for a pricing optimization system, and the pricing optimization system can generate a set of one or more prices for a set of one or more items, where the prices satisfy a maximum number of the prioritized constraints and minimize a disruption between the generated set of one or more prices and a set of one or more original prices. According to the embodiment, the pricing optimization system can efficiently solve constrained optimization problems without the need for commercial math libraries. The pricing optimization system can generate one or more prices that is minimally disruptive to a pre-existing business plan. According to the embodiment, the pricing optimization system can leverage a mathematical structure of input priorities to detect and automatically resolve constraint conflicts, as well as optimize prices consistent with the prioritized constraints. The pricing optimization system can manage a combination of prioritized constraints with prioritized objectives, while ensuring that the generated prices involve the least risk to the retailer.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to solve a constrained pricing optimization problem, the solving comprising:
defining one or more constraints, wherein each constraint of the one or more constraints comprises a mathematical representation of one or more restrictions on a price;
assigning a priority to each of the one or more constraints;
generating one or more prices for one or more items that satisfy a maximum number of the prioritized constraints;
computing a risk value for each price of the one or more prices, for each item, wherein the risk value represents a deviation of the price from an original price of the corresponding item, wherein the computing the risk value for each price uses: (a) the difference between the price and the original price of the corresponding item, (b) one or more parameters that are assigned numerical values, and (c) one or more objective-weights that are assigned numerical values;
dividing a range of the one or more prices into two or more ranges, wherein a change in risk value between each price within one range is different from a change in risk value between each price within the other ranges; and
selecting the price from the one or more prices, for each item, whose risk value represents a minimum deviation from the original price of the item.

2. The computer-readable medium of claim 1, wherein the generating one or more prices for one or more items that satisfy a maximum number of the prioritized constraints further comprises:
ordering the prioritized constraints in a decreasing order of priority;
adding a prioritized constraint of the prioritized constraints to a rule set, wherein the rule set contains one or more constraints;
evaluating the rule set to determine if one or more prices can be generated that satisfy the prioritized constraints contained within the rule set;
defining the prioritized constraint as a hard constraint within the rule set when one or more prices can be generated that satisfy the prioritized constraints contained within the rule set, wherein a hard constraint is a prioritized constraint that must be satisfied;
removing the prioritized constraint from the rule set when one or more prices cannot be generated that satisfy the prioritized constraints contained within the rule set; and
repeating the adding, evaluating, defining, and removing for each prioritized constraint of the prioritized constraints until the rule set comprises the maximum number of the prioritized constraints.

3. The computer-readable medium of claim 1, wherein the generating one or more prices for one or more items further comprises:
ordering the prioritized constraints in a decreasing order of priority;

initializing a feasible rule set to not contain any prioritized constraints, wherein the feasible rule set contains zero or more prioritized constraints;

adding all the prioritized constraints to a checking rule set, wherein the checking rule set contains zero or more prioritized constraints;

evaluating a combination of the feasible rule set and the checking rule set to determine if one or more prices can be generated that satisfy the prioritized constraints contained within the feasible rule set and within the checking rule set;

modifying the feasible rule set to equal the combination of the feasible rule set and the checking rule set, when one or more prices can be generated that satisfy the prioritized constraints contained within the feasible rule set and within the checking rule set;

when one or more prices cannot be generated that satisfy the prioritized constraints contained within the feasible rule set and within the checking rule set:

dividing the checking rule set into a first checking rule helper set and a second checking rule helper set, when the checking rule set contains at least one prioritized constraint, wherein the first checking rule helper set and the second checking rule helper set are substantially equal;

evaluating a combination of the feasible rule set and the first checking rule helper set to determine if one or more prices can be generated that satisfy the prioritized constraints contained within the feasible rule set and within the first checking rule helper set;

modifying the feasible rule set to equal the combination of the feasible rule set and the first checking rule helper set and modifying the checking rule set to equal the second checking rule helper set, when one or more prices can be generated that satisfy the prioritized constraints contained within the feasible rule set and within the first checking rule helper set;

modifying the checking rule set to equal the first checking rule helper set, when one or more prices cannot be generated that satisfy the prioritized constraints contained within the feasible rule set and within the first checking rule helper set; and repeating the dividing the checking rule set, the evaluating the combination of the feasible rule set and the first checking rule helper set, the modifying the feasible rule set, and the modifying the checking rule set until the feasible rule set comprises the maximum number of the prioritized constraints.

4. The computer-readable medium of claim 1, wherein the computing a risk value for each price of the one or more prices further comprises:

dividing a range of the one or more prices into two or more ranges, wherein each range comprises one or more parameters that are assigned numerical values and one or more objective-weights that are assigned numerical values;

computing a difference between the price and the original price of the corresponding item for each price of the one or more prices;

computing a range risk value for each range using: (a) the difference between the price and the original price of the corresponding item, (b) the one or more parameters, and (c) the one or more objective-weights;

summing the range risk values; and assigning the risk value for each price of the one or more prices as the sum of the range risk values.

5. The computer-readable medium of claim 4, wherein, for each item, an anchor price that is provided as input is used in place of the original price of the corresponding item to compute the difference.

6. The computer-readable medium of claim 4, wherein the computing a risk value for each price of the one or more prices further comprises:

calculating a difference between the price and a historical lowest price of the corresponding item for each price of the one or more prices;

calculating a difference between the original price and the historical lowest price of the corresponding item for each price of the one or more prices;

calculating a difference between the price and a historical highest price of the corresponding item for each price of the one or more prices;

calculating a difference between the original price and the historical highest price of the corresponding item for each price of the one or more prices; and computing the range risk value for each range using: (a) the difference between the price and the original price of the corresponding item, (b) the difference between the price and the historical lowest price of the corresponding item, (c) the difference between the original price and the historical lowest price of the corresponding item, (d) the difference between the price and the historical highest price of the corresponding item, (e) the difference between the original price and the historical highest price, (f) the one or more parameters, and (g) the one or more objective-weights.

7. The computer-readable medium of claim 4, wherein the computing a risk value for each price of the one or more prices further comprises:

receiving a setting specified by a user;

mapping the setting to a numerical value;

storing the numerical value as a tolerance parameter;

selecting the price from the one or more prices, for each item, whose risk value is less than the tolerance parameter.

8. The computer-readable medium of claim 7, wherein the setting specified by the user comprises one of a low tolerance setting, a medium tolerance setting, a high tolerance setting, and a turn-off risk constraint setting.

9. The computer-readable medium of claim 7, solving further comprising assigning a penalty for a constraint violation when the risk value for the price is greater than the tolerance parameter.

10. A computer-implemented method for solving a constrained pricing optimization problem, the computer-implemented method comprising:

defining one or more constraints, wherein each constraint of the one or more constraints comprises a mathematical representation of one or more restrictions on a price;

assigning a priority to each of the one or more constraints;

generating one or more prices for one or more items that satisfy a maximum number of the prioritized constraints;

computing, with a processor, a risk value to each price of the one or more prices, for each item, wherein the risk value represents a deviation of the price from an original price of the corresponding item, wherein the computing the risk value for each price uses: (a) the difference between the price and the original price of the corresponding item, (b) one or more parameters that are assigned numerical values, and (c) one or more objective-weights that are assigned numerical values;

dividing a range of the one or more prices into two or more ranges, wherein a change in risk value between each price within one range is different from a change in risk value between each price within the other ranges; and selecting the price from the one or more prices, for each item, whose risk value represents a minimum deviation from the original price of the item.

11. The computer-implemented method of claim 10, wherein the generating one or more prices for one or more items that satisfy a maximum number of the prioritized constraints further comprises:

ordering the prioritized constraints in a decreasing order of priority;

adding a prioritized constraint of the prioritized constraints to a rule set, wherein the rule set contains one or more constraints;

evaluating the rule set to determine if one or more prices can be generated that satisfy the prioritized constraints contained within the rule set;

defining the prioritized constraint as a hard constraint within the rule set when one or more prices can be generated that satisfy the prioritized constraints contained within the rule set, wherein a hard constraint is a prioritized constraint that must be satisfied;

removing the prioritized constraint from the rule set when one or more prices cannot be generated that satisfy the prioritized constraints contained within the rule set; and repeating the adding, evaluating, defining, and removing for each prioritized constraint of the prioritized constraints until the rule set comprises the maximum number of the prioritized constraints.

12. The computer-implemented method of claim 10, wherein the generating one or more prices for one or more items further comprises:

ordering the prioritized constraints in a decreasing order of priority;

initializing a feasible rule set to not contain any prioritized constraints, wherein the feasible rule set contains zero or more prioritized constraints;

adding all the prioritized constraints to a checking rule set, wherein the checking rule set contains zero or more prioritized constraints;

evaluating a combination of the feasible rule set and the checking rule set to determine if one or more prices can be generated that satisfy the prioritized constraints contained within the feasible rule set and within the checking rule set;

modifying the feasible rule set to equal the combination of the feasible rule set and the checking rule set, when one or more prices can be generated that satisfy the prioritized constraints contained within the feasible rule set and within the checking rule set;

when one or more prices cannot be generated that satisfy the prioritized constraints contained within the feasible rule set and within the checking rule set:

dividing the checking rule set into a first checking rule helper set and a second checking rule helper set, when the checking rule set contains at least one prioritized constraint, wherein the first checking rule helper set and the second checking rule helper set are substantially equal;

evaluating a combination of the feasible rule set and the first checking rule helper set to determine if one or more prices can be generated that satisfy the prioritized constraints contained within the feasible rule set and within the first checking rule helper set;

modifying the feasible rule set to equal the combination of the feasible rule set and the first checking rule helper set and modifying the checking rule set to equal the second checking rule helper set, when one or more prices can be generated that satisfy the prioritized constraints contained within the feasible rule set and within the first checking rule helper set;

modifying the checking rule set to equal the first checking rule helper set, when one or more prices cannot be generated that satisfy the prioritized constraints contained within the feasible rule set and within the first checking rule helper set; and repeating the dividing the checking rule set, the evaluating the combination of the feasible rule set and the first checking rule helper set, the modifying the feasible rule set, and the modifying the checking rule set until the feasible rule set comprises the maximum number of the prioritized constraints.

13. The computer-implemented method of claim 10, wherein the computing a risk value for each price of the one or more prices further comprises:

dividing a range of the one or more prices into two or more ranges, wherein each range comprises one or more parameters that are assigned numerical values and one or more objective-weights that are assigned numerical values;

computing a difference between the price and the original price of the corresponding item for each price of the one or more prices;

computing a range risk value for each range using: (a) the difference between the price and the original price of the corresponding item, (b) the one or more parameters, and (c) the one or more objective-weights;

summing the range risk values; and assigning the risk value for each price of the one or more prices as the sum of the range risk values.

14. The computer-implemented method of claim 13, wherein the computing a risk value for each price of the one or more prices further comprises:

receiving a setting specified by a user;

mapping the setting to a numerical value;

storing the numerical value as a tolerance parameter;

selecting the price from the one or more prices, for each item, whose risk value is less than the tolerance parameter.

15. The computer-implemented method of claim 14, further comprising assigning a penalty for a constraint violation when the risk value for the price is greater than the tolerance parameter.

16. A pricing optimization system, comprising:

a memory configured to store a constrained optimization solver module; and a processor configured to execute the constrained optimization solver module stored on the memory;

wherein the processor is further configured, when executing the constrained optimization solver module stored on the memory, to:

define one or more constraints, wherein each constraint of the one or more constraints comprises a mathematical representation of one or more restrictions on a price;

assign a priority to each of the one or more constraints;

generate one or more prices for one or more items that satisfy a maximum number of the prioritized constraints;

compute a risk value to each price of the one or more prices, for each item, wherein the risk value represents a deviation of the price from an original price of the corresponding item, wherein the computing the risk value for each price uses: (a) the difference between the price and the original price of the corresponding item, (b) one or more parameters that are assigned numerical values, and (c) one or more objective-weights that are assigned numerical values;

divide a range of the one or more prices into two or more ranges, wherein a change in risk value between each price within one range is different from a change in risk value between each price within the other ranges; and select the price from the one or more prices, for each item, whose risk value represents a minimum deviation from the original price of the item.

17. The pricing optimization system of claim 16, wherein the processor is further configured, when executing the constrained optimization solver module stored on the memory, to:

order the prioritized constraints in a decreasing order of priority;

add a prioritized constraint of the prioritized constraints to a rule set, wherein the rule set contains one or more constraints;

evaluate the rule set to determine if one or more prices can be generated that satisfy the prioritized constraints contained within the rule set;

define the prioritized constraint as a hard constraint within the rule set when one or more prices can be generated that satisfy the prioritized constraints contained within the rule set, wherein a hard constraint is a prioritized constraint that must be satisfied;

remove the prioritized constraint from the rule set when one or more prices cannot be generated that satisfy the prioritized constraints contained within the rule set; and repeat the adding, evaluating, defining, and removing for each prioritized constraint of the prioritized constraints until the rule set comprises the maximum number of the prioritized constraints.

18. The pricing optimization system of claim 16, wherein the processor is further configured, when executing the constrained optimization solver module stored on the memory, to:

order the prioritized constraints in a decreasing order of priority;

initialize a feasible rule set to not contain any prioritized constraints, wherein the feasible rule set contains zero or more prioritized constraints;

add all the prioritized constraints to a checking rule set, wherein the checking rule set contains zero or more prioritized constraints;

evaluate a combination of the feasible rule set and the checking rule set to determine if one or more prices can be generated that satisfy the prioritized constraints contained within the feasible rule set and within the checking rule set;

modify the feasible rule set to equal the combination of the feasible rule set and the checking rule set, when one or more prices can be generated that satisfy the prioritized constraints contained within the feasible rule set and within the checking rule set;

when one or more prices cannot be generated that satisfy the prioritized constraints contained within the feasible rule set and within the checking rule set:

divide the checking rule set into a first checking rule helper set and a second checking rule helper set, when the checking rule set contains at least one prioritized constraint, wherein the first checking rule helper set and the second checking rule helper set are substantially equal;

evaluate a combination of the feasible rule set and the first checking rule helper set to determine if one or more prices can be generated that satisfy the prioritized constraints contained within the feasible rule set and within the first checking rule helper set;

modify the feasible rule set to equal the combination of the feasible rule set and the first checking rule helper set and modify the checking rule set to equal the second checking rule helper set, when one or more prices can be generated that satisfy the prioritized constraints contained within the feasible rule set and within the first checking rule helper set;

modify the checking rule set to equal the first checking rule helper set, when one or more prices cannot be generated that satisfy the prioritized constraints contained within the feasible rule set and within the first checking rule helper set; and repeat the dividing the checking rule set, the evaluating the combination of the feasible rule set and the first checking rule helper set, the modifying the feasible rule set, and the modifying the checking rule set until the feasible rule set comprises the maximum number of the prioritized constraints.

19. The pricing optimization system of claim 16, wherein the processor is further configured, when executing the constrained optimization solver module stored on the memory, to:

divide a range of the one or more prices into two or more ranges, wherein each range comprises one or more parameters that are assigned numerical values and one or more objective-weights that are assigned numerical values;

compute a difference between the price and the original price of the corresponding item for each price of the one or more prices;

compute a range risk value for each range using: (a) the difference between the price and the original price of the corresponding item, (b) the one or more parameters, and (c) the one or more objective-weights;

sum the range risk values; and assign the risk value for each price of the one or more prices as the sum of the range risk values.

20. The pricing optimization system of claim 19, wherein the processor is further configured, when executing the constrained optimization solver module stored on the memory, to:

receive a setting specified by a user;

map the setting to a numerical value;

store the numerical value as a tolerance parameter;

select the price from the one or more prices, for each item, whose risk value is less than the tolerance parameter.

21. The pricing optimization system of claim 20, wherein the processor is further configured, when executing the constrained optimization solver module stored on the memory, to assign a penalty for a constraint violation when the risk value for the price is greater than the tolerance parameter.

* * * * *

UNITED STATES PATENT AND TRADEMARK OFFICE
CERTIFICATE OF CORRECTION

PATENT NO. : 8,311,878 B2
APPLICATION NO. : 13/113492
DATED : November 13, 2012
INVENTOR(S) : Subramanian et al.

Page 1 of 1

It is certified that error appears in the above-identified patent and that said Letters Patent is hereby corrected as shown below:

Title page 2, in column 1, under "Other Publications", line 2, delete "11.6" and insert -- II.6 --, therefor.

Title page 2, in column 2, under "Other Publications", line 3, delete "Optimiation,"" and insert -- Optimization," --, therefor.

In column 16, line 6, delete "$I_i$)" and insert -- $l_i$) --, therefor.

In column 16, line 8, delete "($I_i$," and insert -- ($l_i$, --, therefor.

In column 16, line 35, delete "$I_i$," and insert -- $l_i$ --, therefor.

In column 16, line 51, delete "W3" and insert -- $W_3$ --, therefor.

In column 21, line 17, delete "$I_i$," and insert -- $l_i$ --, therefor.

In column 21, line 19, delete "$U_i$," and insert -- $u_i$ --, therefor.

Signed and Sealed this
Fifth Day of February, 2013

Teresa Stanek Rea
*Acting Director of the United States Patent and Trademark Office*